US009444329B2

(12) United States Patent
Arno

(10) Patent No.: US 9,444,329 B2
(45) Date of Patent: Sep. 13, 2016

(54) STEP-UP/STEP-DOWN VOLTAGE CONVERTER HAVING LOW OUTPUT RIPPLE

(75) Inventor: Patrik Arno, Sassenage (FR)

(73) Assignee: ST-Ericsson SA, Plan-les-Ouates (CH)

( * ) Notice: Subject to any disclaimer, the term of this patent is extended or adjusted under 35 U.S.C. 154(b) by 319 days.

(21) Appl. No.: 14/000,512

(22) PCT Filed: Feb. 20, 2012

(86) PCT No.: PCT/EP2012/052887
§ 371 (c)(1),
(2), (4) Date: Nov. 19, 2013

(87) PCT Pub. No.: WO2012/113764
PCT Pub. Date: Aug. 30, 2012

(65) Prior Publication Data
US 2014/0070787 A1    Mar. 13, 2014

Related U.S. Application Data

(60) Provisional application No. 61/472,052, filed on Apr. 5, 2011.

(30) Foreign Application Priority Data

Feb. 22, 2011 (EP) .................................. 11305183

(51) Int. Cl.
*H02M 3/02* (2006.01)
*H02M 3/158* (2006.01)
*H02M 3/07* (2006.01)

(52) U.S. Cl.
CPC ............... *H02M 3/02* (2013.01); *H02M 3/07* (2013.01); *H02M 3/1584* (2013.01); *H02M 2003/072* (2013.01)

(58) Field of Classification Search
CPC ........................................................ H02M 3/02
See application file for complete search history.

(56) References Cited

U.S. PATENT DOCUMENTS 5,726,870 A    3/1998  Lavieville et al.
6,055,168 A *  4/2000  Kotowski ............... H02M 3/07
                                                  307/110

(Continued)

OTHER PUBLICATIONS

McIntyre, A., et al., "A Noise-Shaped Switched-Capacitor DC-DC Voltage Regulator, Conference Paper", Proceedings of the 28th European Solid-State Circuits Conference ESSCIRC 2002, Sep. 1, 2002, pp. 375-378, [retrieved on Aug. 20, 2013], retrieved from internet: http://www.imec.be/esscirc/ESSCIRC2002/PDFs/C20.01.pdf.

(Continued)

*Primary Examiner* — Timothy J Dole
*Assistant Examiner* — Yusef Ahmed
(74) *Attorney, Agent, or Firm* — Coats & Bennett, PLLC

(57) ABSTRACT

A voltage converter device converts an input signal having a given input voltage value into an output signal having an output voltage different from the input voltage. The device comprises a main module, arranged between an input terminal and a first circuit node, The device is adapted to output at the first circuit node a pulse-width-modulated signal switching between a first voltage value and a second voltage value, defining a switching range, by switching successively between a first mode of operation and a second mode of operation. The switching range of the pulse width modulation has an amplitude, calculated as the absolute difference between the first and the second voltage value, inferior or equal to half the input voltage.

14 Claims, 16 Drawing Sheets

(56) References Cited

U.S. PATENT DOCUMENTS

| | | | |
|---|---|---|---|
| 6,987,680 B2* | 1/2006 | Vire | H02M 3/158 363/124 |
| 8,854,019 B1* | 10/2014 | Levesque | H02M 3/07 323/266 |
| 2002/0109415 A1 | 8/2002 | McIntyre et al. | |
| 2002/0145413 A1* | 10/2002 | Oshio | H02M 3/18 323/371 |
| 2004/0245972 A1* | 12/2004 | Vire | H02M 3/158 323/282 |
| 2008/0031023 A1 | 2/2008 | Kitagawa et al. | |
| 2008/0129225 A1* | 6/2008 | Yamamoto | H05B 33/0815 315/307 |
| 2008/0150619 A1* | 6/2008 | Lesso | H02M 3/07 327/536 |
| 2008/0150620 A1* | 6/2008 | Lesso | H02M 3/07 327/536 |
| 2008/0150621 A1* | 6/2008 | Lesso | H02M 3/07 327/536 |
| 2009/0072800 A1* | 3/2009 | Ramadass | H02M 3/07 323/271 |
| 2010/0188065 A1* | 7/2010 | Shiwaya | H02M 3/07 323/299 |
| 2010/0295379 A1* | 11/2010 | Garcia | H02J 7/345 307/109 |
| 2011/0062940 A1* | 3/2011 | Shvartsman | H02M 3/07 323/351 |
| 2011/0102069 A1* | 5/2011 | Tsai | H02M 3/07 327/536 |
| 2012/0126778 A1* | 5/2012 | Chevalier | H02M 3/07 323/311 |
| 2013/0287231 A1* | 10/2013 | Kropfitsch | H02M 3/073 381/113 |
| 2013/0328536 A1* | 12/2013 | Ueno | H02M 3/1582 323/271 |
| 2014/0307493 A1* | 10/2014 | Chevalier | H02M 3/07 363/60 |

OTHER PUBLICATIONS

Kormann, B., "High-Efficiency Regulated Charge Pumps for High-Current Applications", Unitrode Design Seminar, Jan. 1, 2001, pp. 4-1 - 4-15, [retrieved on Aug. 20, 2013], retrieved from internet: http://www.ti.com/lit/ml/slup172/slup172.pdf.

* cited by examiner

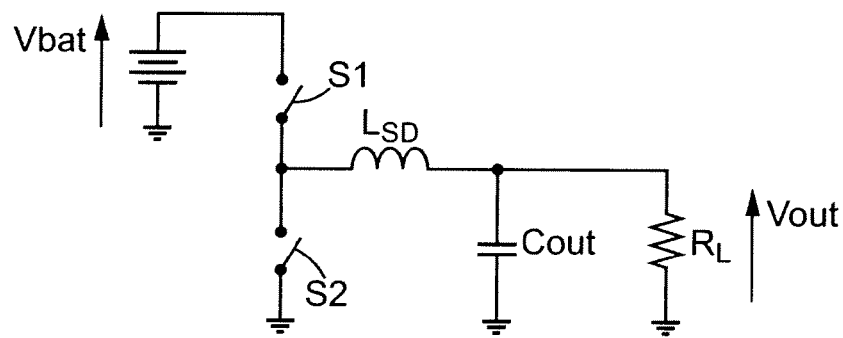
FIG. 1
(PRIOR ART)
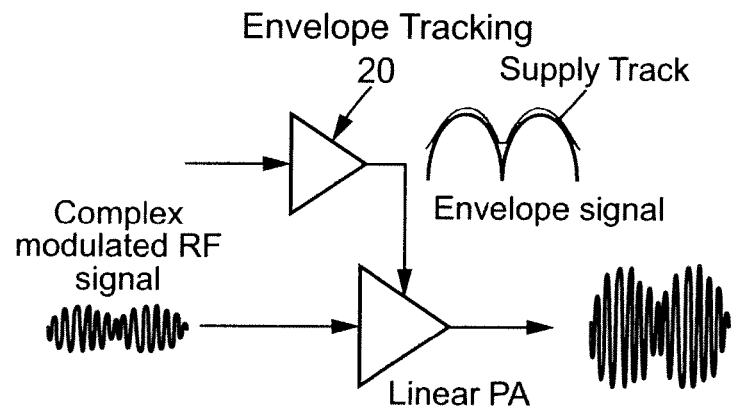
FIG. 2
(PRIOR ART)
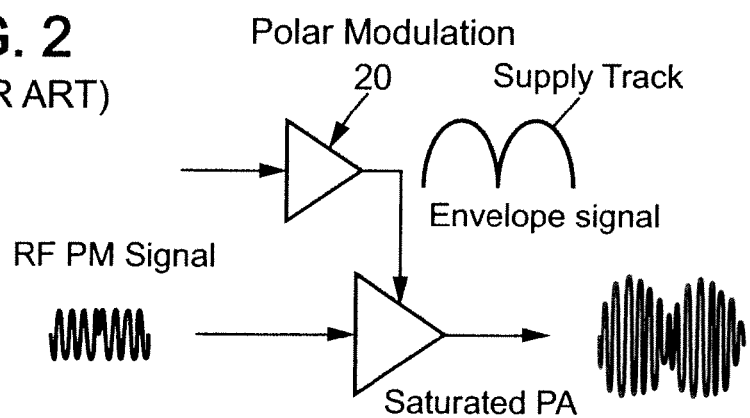

STEP-UP/STEP-DOWN VOLTAGE CONVERTER HAVING LOW OUTPUT RIPPLE

BACKGROUND

1. Technical Field

The present invention generally relates to devices and methods for using DC-DC converters and for converting a continuous signal of a given value into another signal of another value, for example for envelope tracking or polar modulation for radio frequency power amplifiers. The present invention finds applications in particular in electronic portable devices such as for mobile phones, digital walkmen, portable computers, PDA, etc.

2. Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Multiple supply voltages have become increasingly common due to the coexistence of low-power digital circuits, high-speed digital circuits, and analog/RF circuits on a single die. DC-DC converters can be realized as linear, switched-capacitor, and inductive converters.

There are known inductive Step-Down converters as depicted in FIG. 1. Such converters may be used to provide the best efficiency for a wide range of conversion ratios but have higher output ripple than linear converters. As they produce the output signal as a pulse-width modulated (PWM) signal by switching between a supplied voltage of the battery and a ground voltage value, a high level of ripples is generally obtained, even after filtering. The switching can be attained by opening and closing alternatively (and in inverse position) two switches S1 and S2 situated on the connection to the battery or to the ground.

Low ripple behaviour is however a stringent parameter, especially for DC-DC converters dedicated to supply power for radio-frequency (RF) applications, because the ripples may create interferences, with RF signals. They thus decrease the signal-to-noise ratio of the RF signal carried by the circuit.

For a given output capacitor value (Cout) and a given inductor ($L_{SD}$) in a DC-DC converter, ripple reduction schemes traditionally rely either on the use of high-value, off-chip inductors or on the increase of the switching frequency as shown in equation 1.

$$\text{Output Ripple} = \frac{D \cdot (1-D)}{8 \cdot L_{SD} \cdot C_{OUT} \cdot f_{SW}^2} V_{BAT} \qquad \text{Eq. 1}$$

where Vbat is the supply voltage from the battery and D is a working duty-cycle of the PWM signal linked to the output voltage.

This approach is currently used for classic DC-DC converters, where the output voltage is not varying (the output voltage is a DC value converted from Vbat), but this is not appropriate for RF applications wherein the output voltage is amplitude modulated. This is the case for both signal amplification by envelop tracking and by polar modulation.

These applications rely on quickly changing voltage regulators. In RF power amplifiers, efficiency varies with the RF signal amplitude. Usually the yield is maximal at full power and it drops rapidly when the amplitude of the RF signal decreases, as a larger part of the supply voltage is not used and is thus dissipated in transistors. This drawback may be partly compensated by tracking the signal amplitude with an efficient power supply modulator that has a quick response.

In such systems, as shown in FIG. 2, an efficient, WIDE-BANDWIDTH envelope-tracking power supply 20 modulates the supply voltage for the RF power amplification (RFPA).

In order to track the envelope of high-bandwidth modulated signal, a DC-DC converter commonly uses a low pass filter, typically of LC type, positioned near an output terminal, with a cut-off frequency higher than the modulation bandwidth. This relies on the use of a small inductor (or small capacitor) as shown by Eq.2.

$$LC \text{ filter bandwidth} = \frac{1}{2\pi\sqrt{L_{SD}C_{OUT}}} > \text{Modulation Bandwidth} \qquad \text{(Eq. 2)}$$

As a result, a compromise has generally to be found between the amplitude of the ripples outputted, the bandwidth of the converter and the switching frequency $f_{sw}$ of the PWM signal.

In a standard Step-Down DC-DC converter as illustrated in relation to FIG. 1 two equations have generally to be optimized in order to reduce the outputted ripples, achieve the necessary bandwidth to perform Envelope Tracking or Polar Modulation applications:

$$\text{Output Ripple} = \qquad \text{(Eq. 3)}$$
$$\frac{D \cdot (1-D)}{8 \cdot L_{SD} \cdot C_{OUT} \cdot f_{SW}^2} V_{BAT} \leq \text{Maximum Ripple Allowed}$$

$$LC \text{ filter bandwidth} = \frac{1}{2\pi\sqrt{L_{SD}C_{OUT}}} \geq \text{Modulation Bandwidth} \qquad \text{(Eq. 4)}$$

As a result the easiest solution is to increase the switching frequency $f_{sw}$ to reduce the outputted ripples and dimension the output filter so as to cope with bandwidth specifications.

But, nonetheless, this solution presents some issues. For example, the Standard Step-Down DC-DC used at a high switching frequency, has an efficiency frequently lower than 70% due to the high switching frequency. Furthermore, the high frequency may create interferences with RF signals that may be carried in the circuit, or that may be amplified using the output voltage. Eventually, the standard step-down converter cannot output a voltage superior to the supply voltage.

Alternative solutions may use different architecture instead of a classic one.

A standard Step-Down DC-DC, using an AB class amplifier to compensate has also an efficiency that is frequently under 70% due to the use of the amplifier. Furthermore, it proves difficult to control the current sharing between the converter and the amplifier.

An Interleaved Step-Down converter also has some few limitations. Its efficiency is reduced due to the use of two power stages each having at least one power coil. There are difficulties to maintain a good synchronization needed between 4 phases. Eventually, it cannot output a voltage superior to the supply voltage.

SUMMARY

To improve the situation, a first aspect of the present invention relates to a multi-level Step-Up/Down converter for low ripple, high bandwidth. It allows for tracking applications such as envelope-tracking or polar modulation in radio frequency power amplifiers (RF PAs). Such a multilevel converter offers advantages in terms of smaller ripples, lower losses, higher bandwidth, or may contribute to maintain the previous properties while allowing for reduced size of magnetic components (coils) compared to a standard Step-Down converter, a hybrid converter or an interleaved converter.

Hybrid combinations of linear and switching regulators (FIG. 3) have been proposed both for audio amplifiers, and dynamic supply modulators for RF power amplifiers. In contrast to conventional voltage regulation applications, audio and RFPA supply applications require fast, accurate, time-varying regulation of the output voltage to meet strict spectral performance requirements. Hybrid topologies show promise for these applications because they combine favourable aspects of both switching and linear regulators. Specifically, high gain-bandwidth linear regulators can provide fast voltage regulation and high dynamic range, while properly designed switching regulators can achieve high efficiency for a wide range of conversion ratios.

FIG. 3 shows a schematic representation of a hybrid regulator consisting of parallel linear and switching stages. The linear regulator, using an AB class amplifier, is typically used as a voltage follower with local feedback to reduce output impedance and improve accuracy. With high closed-loop bandwidth, the linear regulator 30 can be used to attenuate ripple formation from the DC-DC converter stage 31, and can also supply a portion of the dynamic power of the signal.

FIG. 4 shows a simplified circuit diagram for a stacked Step-Down (Buck) interleaved topology. In this circuit, the primary power stage 31 (S1, S2, LSD1, $C_{OUT}$) independently supplies the load current "Ip" with some inherent ripple, while the secondary power stage 32 (S3, S4, LSD2, $C_{INT}$) generates an equal but opposite current ripple "Is" to cancel the ripples formed in the primary power stage 31. The ripple cancellation is accomplished for all duty-cycles (corresponding to different output voltage ranges) by operating the primary power stage 31 with a duty-cycle of D and the secondary power stage 32 with a duty-cycle of 1-D resulting in the current waveforms shown in the left diagram 34 of FIG. 4. The benefit of this cancellation is seen in the right diagram 35 of FIG. 4. In comparison to the buck converter the current ripple for an interleaved converter is lower but is minimized only for a duty cycle of 50%. Diagram 35 shows also the results obtained for a stacked interleaved design for which the current ripple is always minimal, whatever the duty cycle.

Embodiments are related to a new DC-DC Step-Up/Down converter architecture that is based on a combination of the architectures of a Charge-Pump and of a Step-Down converter. The charge pump architecture is placed at an input terminal of the step-down converter, thus it is positioned between an entry terminal of the new DC-DC Step-Up/Down converter, called converter, for receiving an input electrical signal, and the known step-down converter.

One embodiment is related to a charge pump designed for the new DC-DC Step-Up/Down converter. It is thus related to a device for converting an input signal having a given input voltage value into an output signal having an output voltage different from the input voltage comprising:
  an input terminal adapted to receive the input signal,
  an output terminal, coupled to a first circuit node, adapted to output the output signal converted from the input signal,
  a main module arranged between the input terminal and the first circuit node and adapted to output, at the first circuit node, a pulse-width-modulated (PWM) signal switching between a first voltage value and a second voltage value, defining a switching range, by operating in at least two modes of operation with a given duty cycle.

The device is configured to work by alternating different modes of operation. In particular, in a first mode of operation, the main module is coupled to the input terminal so as to store power from the input signal and is further arranged to output the first voltage value to the first circuit node.

In a second mode of operation, the main module is arranged to output a second voltage value different from the first voltage value to the first circuit node by using the power stored during the first mode of operation.

Eventually, in a device according to the invention the switching range of the pulse width modulation (PWM) has an amplitude, calculated as the absolute difference between the first and the second voltage value, inferior or equal to half the input voltage. As the amplitude is small, the first voltage value and the second voltage value are such that at least one of those values is closer from a desired signal than if the first and second values were each one of the input voltage and a ground voltage.

This construction of a charge pump allows for creating PWM signals of smaller switching amplitude than in the prior art using only a given input voltage. It is thus possible to have duty cycles and switching frequency relaxed compared to a PWM signal limited to a zero/Vbat switching while obtaining a same mean output voltage.

As such, if the charge pump is coupled to a low pass filter, ripples outputted in both an outputted current and an outputted voltage may be reduced. Ripples are formed when the switching frequency of the PWM signal is low and are not totally filtered by the low pass filter. Alternatively, if the amplitude of a discontinuity is important, when the duty cycle is unbalanced, effects of the switching may still be perceived after filtering.

By using a charge pump that outputs a PWM signal with smaller amplitude than otherwise possible with a given input voltage, the risks of seeing ripples at a given switching frequency are reduced. Thus it is possible to either reduce the switching frequency or need a less performing low-pass filter. Further, even if ripples are created, they have a smaller amplitude than otherwise, the amplitude of the PWM signal being smaller. Also, lower electrical stress is created in both passive and active components of the low pass filter as the amplitude to be smoothed is smaller than possible according to the prior art.

In an advantageous embodiment, the device further comprises, between the first circuit node and the output terminal, a low-pass filter adapted to smooth the PWM signal. This way, a signal equal to a mean of the PWM signal may be outputted from the device. This device may function as a DC-DC converter, outputting continuous output current for noise optimization with low ripples.

In a preferred embodiment, the charge pump of the invention may be adapted to work with various duty cycles and in at least two switching ranges and preferably in at least three switching ranges. Advantageously, the device is adapted to change from a switching range to another switching range during use. As such, the charge pump of the invention is advantageously adapted to work both with a given duty cycle that may be changed as desired, and in a switching range that may also be changed as desired. This allows changing the outputted voltage's mean according to any need. Thus, if the charge pump is connected in input of a low pass filter, the devices of the invention may output continuous voltages that are adaptable to a given need, and may be changed if the need changes.

Further, by varying continuously the output voltage after smoothing, an amplitude modulated output voltage signal may be outputted. In such case, the amplitude modulated output voltage signal has an amplitude of modulation comprised at least between the input voltage and a zero value. But, advantageously, for each duty cycle, the amplitude of the PWM signal to smooth is only a fraction of said amplitude of modulation.

Thus the device of the invention may be used as a modulator with low ripples and high reactivity. Such a device may be used for envelop tracking or polar modulation by outputting a voltage adapted to the needed signal. A converter allowing for better efficiency is also provided. In the case of RF amplification, the converter-modulator of the invention may output a voltage tailored to the needs, limiting energy loss. Further, as the device outputs few ripples, the risks of interference between ripples and an RF signal are reduced.

Advantageously, the main module comprises at least N capacitor modules, N being an integral number greater or equal to 2, and small switches adapted to arrange the N capacitor modules according to any of the first and second modes of operation of any switching range. The first mode of operation is preferably made by connecting N capacitors modules in series in a chain of capacitor modules between the input terminal and a ground terminal, each capacitor module having a first terminal which is on the side of the input terminal and a second terminal which is on the side of the ground. The first mode of operation is made by additionally coupling the first circuit node to the ground, either directly or through an internal node of the chain of capacitor modules, J capacitor modules being connected in series between said internal node and the ground terminal. J is an integer chosen between 1 and N included.

The ground terminal may be at a ground potential or at any other reference potential, equal to zero or different from zero.

The main module is thus adapted to store a given power during the first mode of operation, each capacitor module being adapted to store a 1/N fraction of Vbat. Furthermore, a J/N fraction of the input voltage is outputted at the first circuit node, defining a first voltage value inferior or equal to Vbat.

In a first embodiment of the second mode of operation, L capacitors modules are preferably connected in series between the ground and the first circuit node. In which case the first terminal of each capacitor module 5(i) is on the side of the first circuit node (N1) and the second terminal of each capacitor module 5(i) is on the side of the ground terminal. L is an integer chosen inferior or equal to N.

Thus a L/N fraction of the input voltage may be outputted at the first circuit node, defining a second voltage value inferior or equal to Vbat, different from the first voltage value. Further, the main module is configured to produce the second voltage value by using only power stored during the first mode of operation. The main module and the first circuit node are isolated from the input terminal. The person skilled in the art understands that to have the second voltage value (a L/N fraction of the input voltage) different than the first voltage value (a J/N fraction of the input voltage), L is preferably different from J.

Alternatively, in a second embodiment of the second mode of operation, connecting L capacitors modules are advantageously connected in series between the first circuit node and the input terminal.

In a first option of the second embodiment of the second mode of operation, the second terminal of each capacitor module is advantageously on the side of the first circuit node and the first terminal of each capacitor module is on the side of the input terminal. L is an integer chosen inferior or equal to N.

Thus a (N−L)/N fraction of the input voltage may be outputted at the first circuit node, defining a second voltage value inferior or equal to Vbat, different from the first voltage value. The main module is configured so as to subtract a L/N fraction of the power stored during the first mode of operation from the input signal in order to produce the second voltage value. The person skilled in the art understands that to have the second voltage value (a (N−L)/N fraction of the input voltage) different than the first voltage value (J/N fraction of the input voltage), L is preferably different from N−J.

In a second option of the second embodiment of the second mode of operation, called boost mode, the first terminal of each capacitor module preferably is on the side of the first circuit node and the second terminal of each capacitor module is on the side of the input terminal. L is an integer chosen inferior or equal to N and superior to zero.

Thus a (N+L)/N fraction of the input voltage may be outputted at the first circuit node, defining a second voltage value superior to Vbat. The main module is configured so as to add a L/N fraction of the power stored during the first mode of operation from the input signal in order to produce the second voltage value. It is thus possible to work in boost mode, outputting a voltage value that is greater than the input voltage value.

Advantageously, in the two embodiments of the second mode of operation, if L is an integer superior to zero and inferior or equal to N/2, in the second mode of operation, the N capacitor modules are preferably arranged in multiples groups of L capacitor modules. If a multiplicity of such groups is obtained, they are advantageously mounted in parallel to each other, and each group is connected in series between the first circuit node and respectively the ground or the input terminal.

One easily understands that the number of capacitor in series in each group defines a voltage value outputted during the second mode of operation, and that the number of groups defines a current value outputted in the second mode of operation. Thus, by defining the number of groups and the size of each group, the device is easily configured to output directly the voltage value and the current value, or to subtract or to add the voltage value to the input voltage value.

By defining the size of the groups and choosing the second mode of operation used, it is possible to output a second voltage value different than the first voltage value, in which the difference is equal to a 1/N fraction of the input voltage. Switching amplitudes of 1/N Vbat or thus advantageously created, allowing, as previously mentioned, for small amplitude PWM signals.

Further, advantageously, the main module may be adapted to use, for a given second voltage value outputted at the first circuit node, the embodiment of the second mode of operation that allows more groups of L capacitor modules in the second mode of operation.

Moreover, the main module may be adapted to work in a first configuration in which the first voltage value is greater than the second voltage value or in a second configuration in which the first voltage value is smaller than the second voltage value. For a given switching range, it may be advantageous for the main module to be adapted to work in the configuration that allows more groups of L capacitor modules in the second mode of operation.

The main module is preferably adapted to activate two modes of operation of a switching range between two modes of operation of another switching range, in which for one of the two switching range, one of the first and second voltage values is equal to one of the first or second voltage values of the other of the two switching ranges. Thus it is possible to create a smooth transition in the outputted voltage if the charge pump changes of switching range.

Advantageously, for at least one switching range, both the first and second voltage values are different from the input voltage (Vbat) and from a zero value. Thus the amplitude of the switching ranges is at least inferior to one third of the input voltage value, which allows for a PWM signal that has first and second voltage values closer to the output signal.

A master module may advantageously be added, adapted to control the main module to operate specifically two modes of operation according to a given switching range and a given duty cycle. Preferably, the master module is adapted to control selectively, during a mode of operation, the small switches enabling each mode of operation. It is then possible to change the switching range and the duty cycle only by changing the control imposed by the master module and without changing the charge pump.

The master module is preferably adapted to change the switching range and/or the duty cycle that control the main module according to a comparison of a reference signal with the output signal. Thus, it is possible to create a close-loop mode in which the switching range and the duty cycle of the charge pump change according to a reference voltage.

The device may further comprise, according to an advantageous embodiment, as many comparator as there are switching range. The master module is also preferably adapted to generate an error signal based on the comparison of the reference signal with the output voltage. The error signal is preferably outputted to the comparators in order to create a pulse-width modulated command signal for each switching range. The master module is adapted to control the main module in accordance to a combination of the pulse-width modulated command signals. As such, the error signal is used both to compare the value of the output voltage with a desired output voltage (namely the reference signal) and to control the charge pump. Thus, advantageously, there is only one command loop for controlling the charge pump and verifying its performances.

An embodiment relates to a method for converting an input signal, having an input voltage, into a signal different than the input signal. As described, a pulse-width-modulated signal is created by a main module by outputting a voltage switching between a first voltage value and a second voltage value, different than the first voltage value, with a given duty cycle, the first and second voltage values defining a switching range. In said method, the switching range of the pulse-width modulation has an amplitude, calculated as the absolute difference between the first and the second voltage value, inferior or equal to half the input voltage (Vbat).

Advantageously, following the aforementioned method, the PWM signal is smoothed through a low-pass filter to produce an output signal equal to the mean of the PWM signal.

The amplitude of the PWM signal to be smoothed being smaller than proposed according to the prior art, the ripples are reduced for a given switching frequency, and a given low pass filter.

Further, the PWM signal is advantageously created by outputting the first voltage value while storing some power issued from the input voltage in a first mode of operation and in a second mode of operation, outputting the second voltage value by using the power stored during the first mode of operation.

BRIEF DESCRIPTION OF THE DRAWINGS

Embodiments of the present invention are illustrated by way of example, and not by way of limitation, in the figures of the accompanying drawings, in which like reference numerals refer to similar elements and in which:

FIG. 1 is a schematic view of a standard DC-DC converter.

FIG. 2 is a schematic view of devices used for envelope tracking and polar modulation.

DESCRIPTION OF PREFERRED EMBODIMENTS

As previously mentioned, the invention relates principally to a device adapted for producing an electrical output signal of voltage different than an input voltage of an input signal. The device comprises a module adapted to create a pulse width modulated electrical signal (PWM signal) switching between two voltage values in which one voltage value is different from either the input voltage or a voltage corresponding to direct connection to the ground. Thus a primary embodiment is focused on providing such a module. It is preferably a charge pump adapted to produce multiples switching ranges for the PWM signal, and it will be referred as a multilevel charge pump hereafter unless otherwise specified.

The "ground terminal" defines a terminal that is adapted to receive a reference voltage, called ground voltage Vg, that is used to quantify the input voltage and the output voltage outputted from the device. Generally the ground voltage is common to the devices of the invention and any other device forming a functional unit with the devices of the invention. In the following part of the specification, the ground is considered to be at a 0V voltage, and all voltages are expressed taking this into account. Thus mentions of "input voltage" may preferably be read as "the difference between the input voltage and the ground voltage" in case the ground voltage is different from 0V.

First Embodiment of a Multilevel Charge Pump:

Referring to FIGS. 5A to 5E there is shown therein a schematic view of an embodiment of a multilevel charge pump according to the invention.

Figure 3:
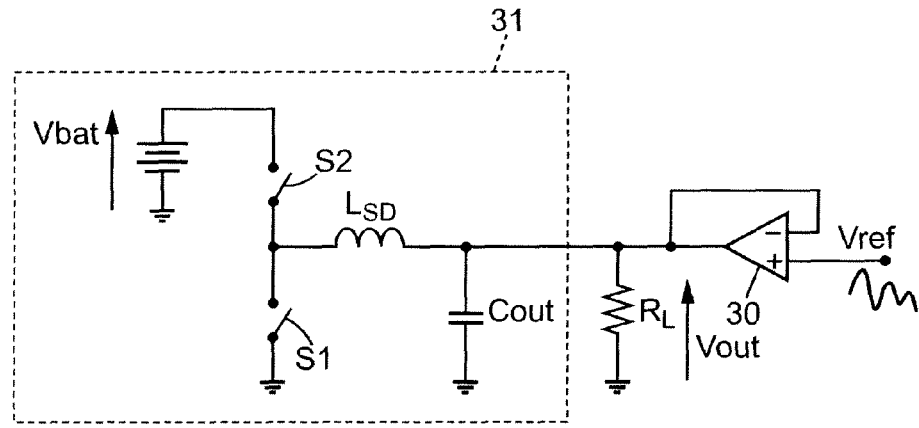
FIG. 3 is a schematic view of a hybrid regulator consisting of parallel switching stages and AB class regulator.
Figure 4:
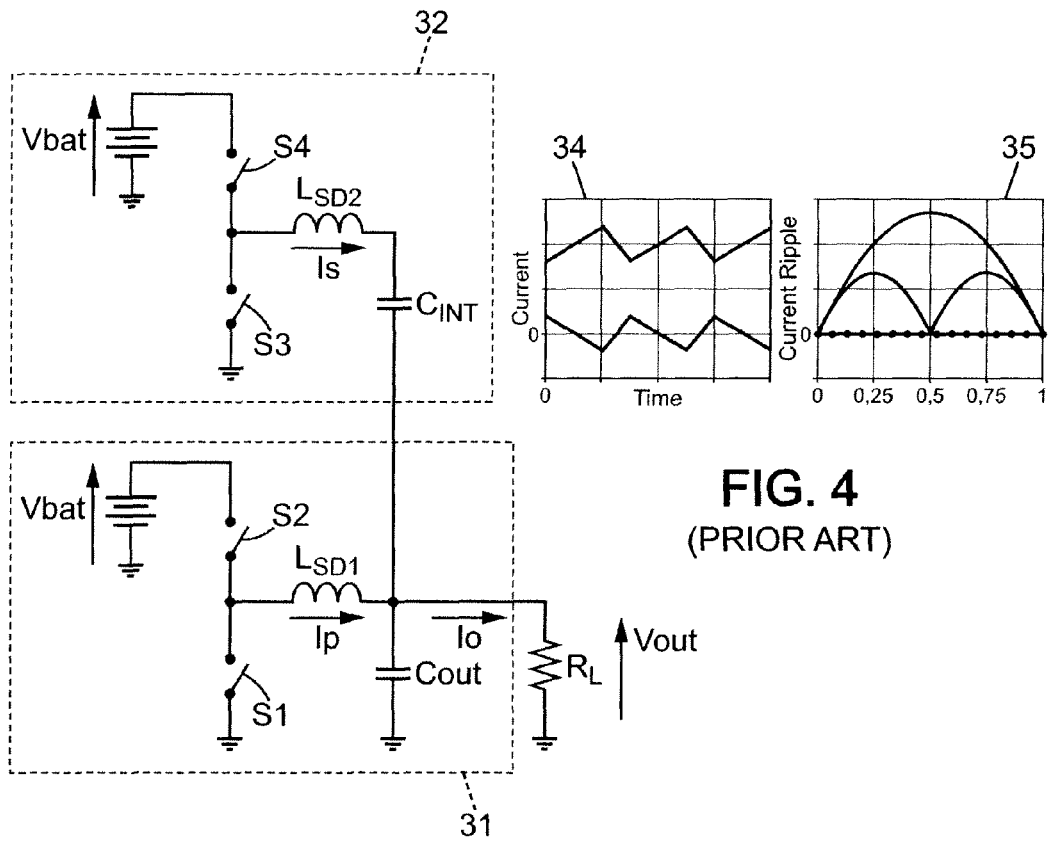
FIG. 4 is a schematic circuit diagram for a stacked Step-Down (Buck) interleaved topology.
Figure 5A:
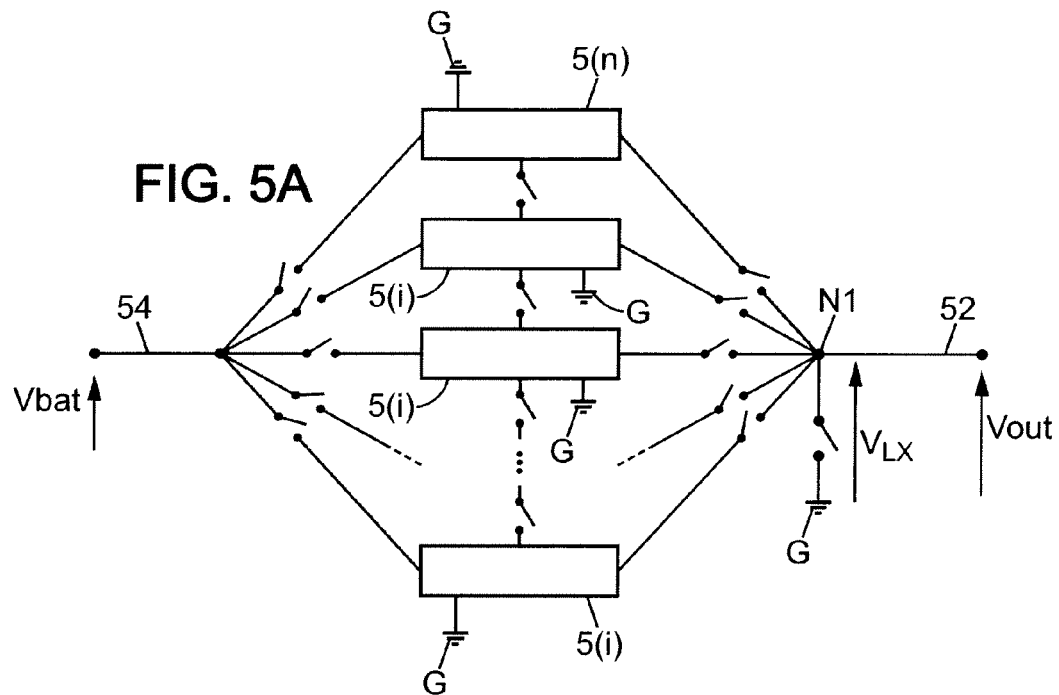
FIGS. 5A to 5F are schematic views of modes of operation of a charge pump according to an embodiment of the invention.

FIG. 5A illustrates a global schematic view of the charge pump that represents every connection with switches. FIG. 5B to 5E illustrates schematics of the charge pump in different modes of operation, and as such, neither the interrupted connections nor the switches are represented.

The multilevel charge pump 56 comprises an input terminal 54 adapted to receive an input signal having an input voltage Vbat and an output terminal 52 of the charge pump adapted to be connected to a first circuit node N1, and to output an intermediate output voltage $V_{LX}$, converted from the input voltage Vbat, at the first circuit node N1 (FIG. 5A). The charge pump comprises further a main module connected between the input terminal and the output terminal of the charge pump.

The main module 56', the input terminal 54 and the first circuit node N1 have connections enabling them to be electrically connected, when necessary, to a reference voltage used as a ground value for the entire circuit. It will be called "ground" thereafter and all voltage values will be expressed hereafter as if the ground's value is zero.

The main module 56' of the multilevel charge pump 56 advantageously comprise of a given number N of capacitor modules 5(i), with i an integer comprised between 1 and N. N is an integer number greater than 2. The capacitor modules 5(i) are each directly connected with the entry terminal 54. They are each directly connected with the first circuit node N1. Furthermore, each capacitor modules 5(i) is directly connected to the ground. Last, each capacitor module 5(i) is directly connected to capacitor modules 5(i-1) and capacitor modules 5(i+1), respectively the capacitor modules sandwiching capacitor modules 5(i). The man of the art will know that all the connections mentioned up to here are adapted to be enabled or disconnected through means of interrupting modules such as switches.

A charge pump works by switching between a first mode of operation and a second mode of operation. For ease of understanding the first mode of operation will be called "charging mode" thereafter and the second mode of operation will be called "discharging mode" thereafter, even if such an appellation is not totally accurate for some embodiments of the invention.

The intermediate output voltage $V_{LX}$ switches, due to the switching of modes of operation, between a first voltage value of the charging mode and a second voltage value of the discharging mode with a given duty cycle. The first voltage value and the second voltage value define a switching range for the intermediate output voltage $V_{LX}$.

At the first circuit node N1, a pulse width modulated signal (PWM signal) is outputted by switching the intermediate output voltage $V_{LX}$ in a given switching range. As such, a switching range in the sense of the invention represents a switching range of a PWM signal outputted from the charge pump.

If the switching has a high enough frequency, called switching frequency $f_{SW}$, the intermediate output voltage $V_{LX}$ will have a perceived value, perceived at a lower frequency, comprised between the first voltage value and the second voltage value. The exact value of the perceived value will principally depend on the respective duration of each mode, called duty-cycle.

Figure 5B:
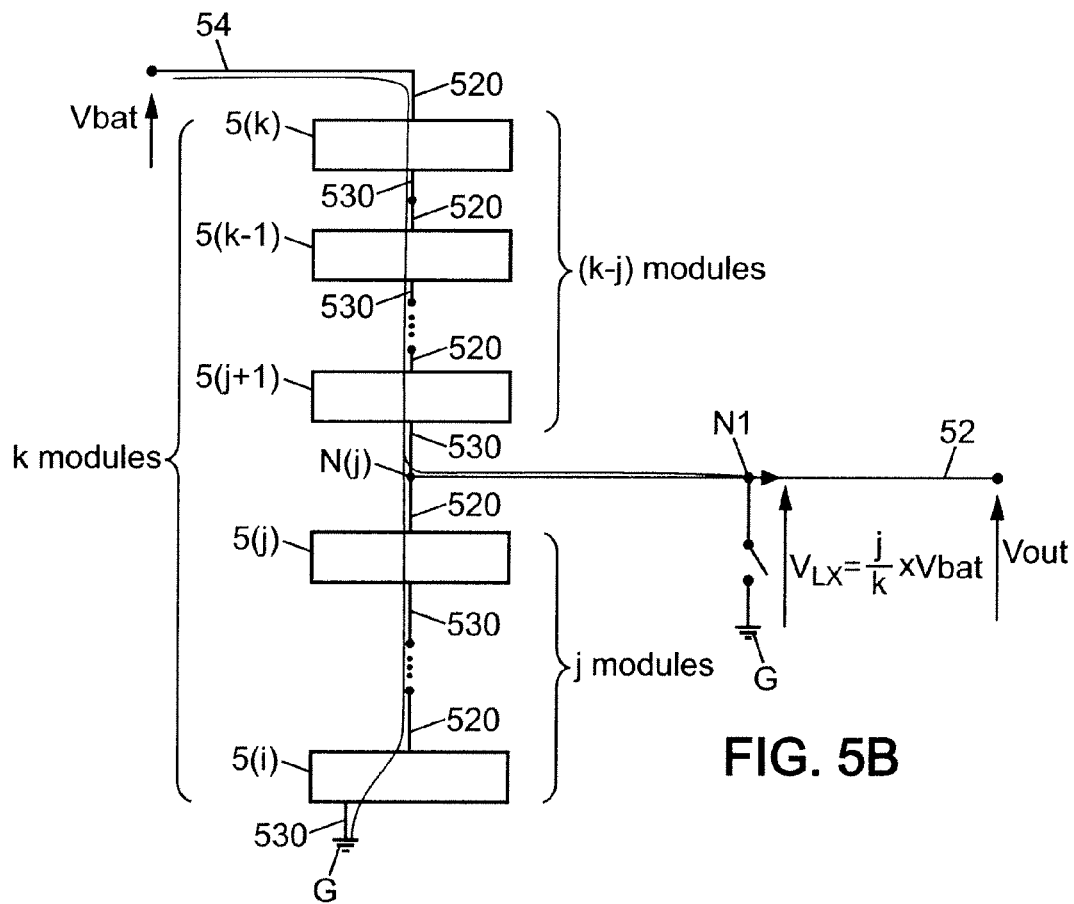

First Mode of Operation of the Charge Pump:

In the charging mode various fractions of the input voltage Vbat can be outputted as values of the intermediate output voltage $V_{LX}$ depending on a number k of capacitor modules 5(i) connected in series between the input terminal 54 and the ground Vg and depending on a number j of those k capacitor modules 5(i) connected in series between the ground and the first circuit node N1. An other way to say it is that if k capacitor modules 5(i) are mounted in series with the input terminal 54 and (k−j) of them are in series between the input terminal 54 and the first circuit node N1 while the remaining j capacitor modules 5(i) are connected to the ground, the intermediate output voltage $V_{LX}$ is roughly equal to a j/k fraction of the voltage of the input voltage Vbat. In FIG. 5B, the first circuit node N1 is connected to an internal node N(j) positioned between the capacitor module number j calculated from the ground and the capacitor module number j+1 calculated from the ground. The dark lines represent the electrical connections.

In the mean time, during the charging mode, each k capacitor module 5(i) is individually loaded with a portion of power from the input signal, called stored charge. The stored charge is advantageously a voltage and it is roughly equal of 1/k of the difference between the input voltage Vbat and the ground voltage Vg. As the ground voltage is defined as a zero voltage, the stored charge is roughly equal to Vbat/k. The power stored commonly through use of the k capacitor, will be called "power stored during the charging mode".

Each capacitor module 5(i) comprises a first terminal 520 and a second terminal 530.

For the charging mode, the capacitor modules 5(i) are coupled through the first terminal 520 to the input terminal and through the second terminal 530 to the ground. Thus, a capacitor module 5(*i*) has, during the charging mode, its first terminal 520 on the side of the input terminal 54 and its second terminal 530 on the side of the ground G.

The main module, and as such the multilevel charge pump, is preferably adapted to use the power stored during the charging mode to output the second voltage value to the first circuit node N1 during the discharging mode.

Different Embodiments of the Second Mode of Operation of the Charge Pump:

In a first embodiment of the discharging mode, it is possible to connect (j+1) or (j−1) of the loaded k capacitor modules 5(*i*) in series between the ground and the first circuit node N1. The loaded (j+1) or (j−1) capacitor modules discharge in series into the first circuit node N1.

It is preferable that each individual capacitor modules 5(*i*) is connected through the first terminal 520 to the first circuit node N1, or to the second terminal 530 of a capacitor module 5(*i*) that is in series between the considered capacitor module 5(*i*) and the first circuit node N1.

If the (j+1) or (j−1) loaded k capacitor modules 5(*i*) are connected in series between the ground and the first circuit node N1, the intermediate output signal $V_{LX}$ has a value of respectively a fraction (j+1)/k or (j−1)/k of the input signal Vbat. In this embodiment the first circuit node N1 and (j+1) or (j−1) of the loaded k capacitor modules 5(*i*) are preferably disconnected from the input terminal 54.

By switching between the charging mode and the discharging mode according to this embodiment of the discharging mode, it is possible to create an intermediate output voltage $V_{LX}$ oscillating between a j/k fraction of Vbat and a (j+1)/k or a (j−1)/k fraction of Vbat.

Figure 5C:
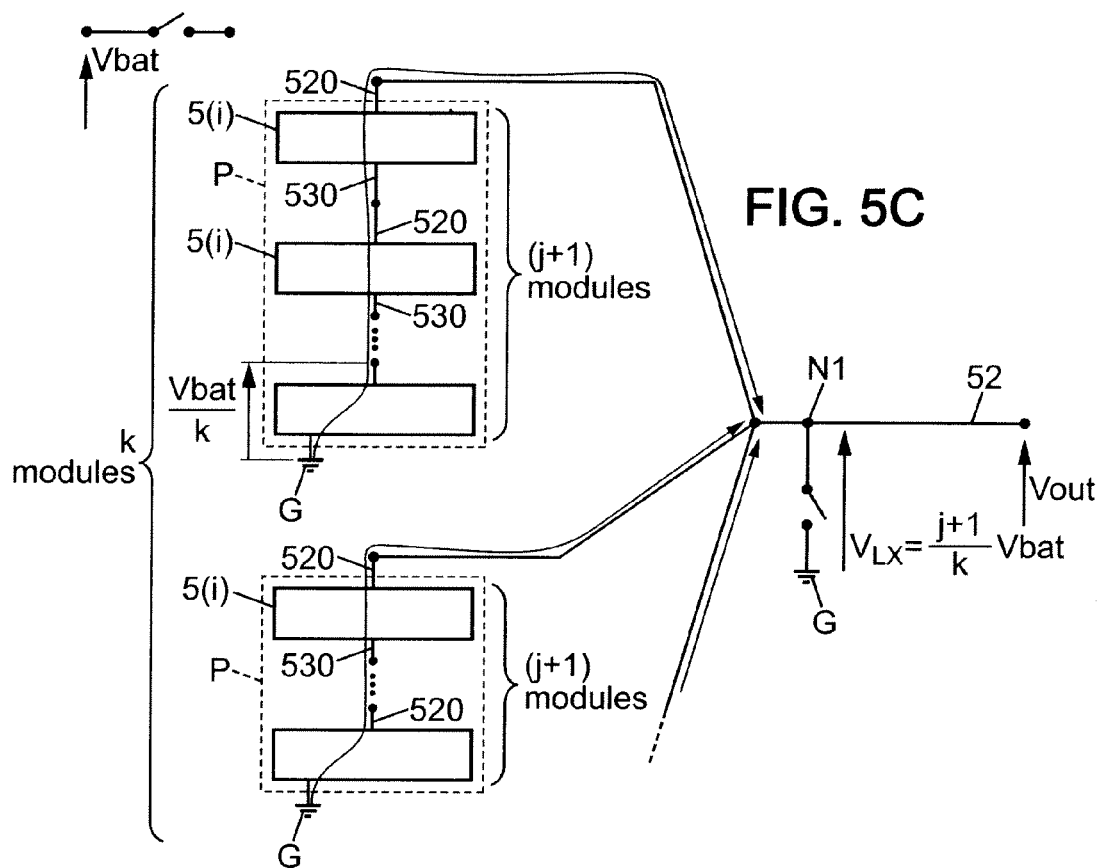

In the discharging mode, if the k capacitor modules 5(*i*) can be arranged so as to form more than one group P of (j+1) (respectively (j−1)) capacitor modules 5(*i*), those groups P are mounted in parallel (FIG. 5C). The voltage outputted at the first circuit node N1 will be identical, but the current will be more important. In FIG. 5C, the groups P are represented as made of j+1 capacitor modules 5(*i*) in series, but it is understood that the groups may each comprise as few as one capacitor modules if there are k groups P and as much as k/2 capacitor modules if there are two groups P, and that j+1 may be replaced by j−1 or any other wanted value.

Figure 5D:
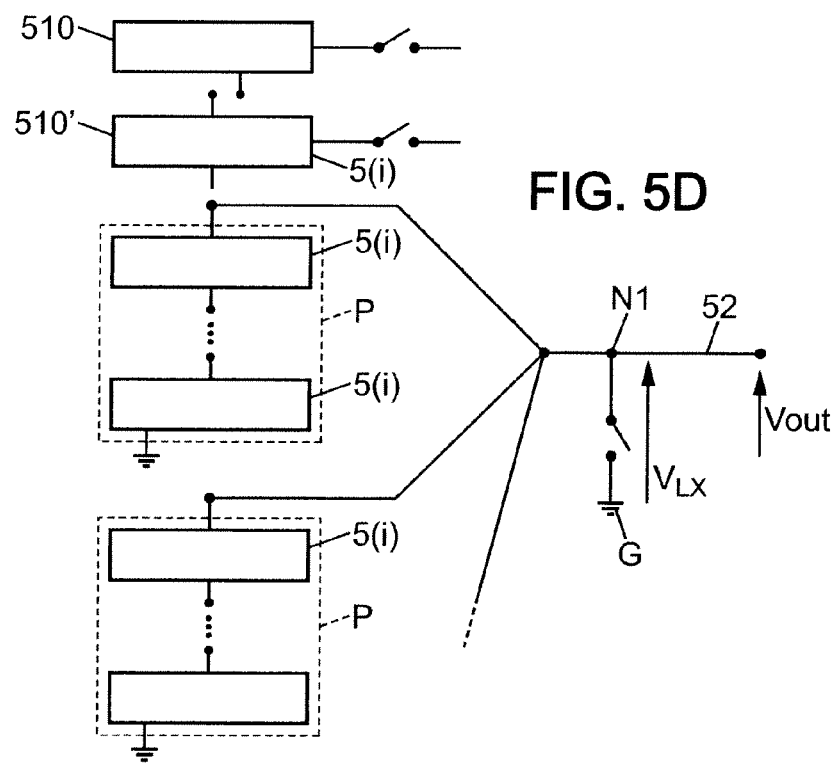

Preferably, the remaining capacitor modules 5(*i*) (if any) are not connected to the first circuit node so as not to disturb the calculation of the intermediate output voltage $V_{LX}$. Those remaining capacitor modules 5(*i*) are defined as capacitor modules 5(*i*) that could not be grouped to form a group P of a predetermined number of capacitor modules. Such a case is represented in FIG. 5D by capacitor modules 510 and 510'.

As a variant, if the impact on the value of the intermediate output voltage $V_{LX}$ is both known and desirable, the remaining capacitor modules 5(*i*) are be connected in series into an unfinished group P' mounted in parallel with the other groups P of (j+1) (respectively (j−1)) capacitor modules 5(*i*). The unfinished group P' comprising less capacitor modules 5(*i*) than the other groups P. Each capacitor module 5(*i*) having a stored charge of a 1/k fraction of the input voltage Vbat, the intermediate output voltage $V_{LX}$ is then easily calculated. As another variant, the remaining capacitor modules 5(*i*) are connected individually in series with the some of the other groups P of (j+1) (respectively (j−1)) capacitor modules 5(*i*). It means that some of the groups P will comprise j or j+2 capacitor modules 5(*i*). The impact on the intermediate output voltage $V_{LX}$ is then easily calculated.

Those two variants will not be described further but the invention is also relevant to the use of these variants. In the invention, when the intermediate output voltage $V_{LX}$ is expressed, in the discharging mode, as a fraction of the input voltage Vbat, it may also mean that the intermediate output voltage $V_{LX}$ may slightly differ from said fraction of the input voltage Vbat due to one of the variants aforementioned.

Thus, by allowing outputs of various fractions of the input voltage Vbat, either in the charging mode or in the discharging mode, a various number of intermediate output voltages $V_{LX}$ can be outputted. Many switching ranges can be created for the PWM signal, in which the intermediate output voltage $V_{LX}$ switches alternatively between a j/k fraction of the input voltage Vbat and a (j+1)/k fraction of the input voltage Vbat, just by adapting the multilevel charge pump to work with different values of j at different times.

In a switching range, the outputted voltage values for the charging mode and for the discharging mode are fractions of the input voltage Vbat, and as such, at least one of them is different from the input voltage Vbat or the ground voltage Vg. Thus, the first and second voltage values are relatively close to each other. They can be chosen so as to flank a desired voltage value from as close as possible.

Figure 5E:
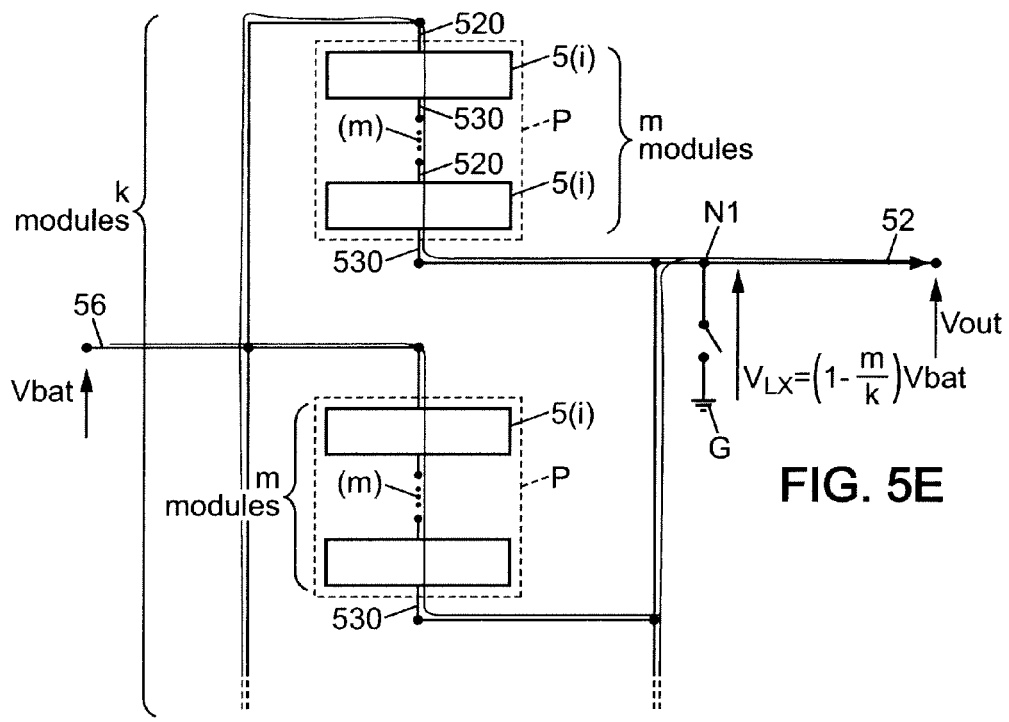

In a second embodiment of the discharging mode, it is possible to connect m of the loaded k capacitor modules 5(*i*) in series between the input terminal 54 and the first circuit node N1 in a chain of capacitor modules. The chain of m capacitors modules 5(*i*) then presents a load that is equal to m times the individual stored charge of each capacitor module (FIG. 5E).

Following a first option (FIG. 5E), the capacitor modules 5(*i*) are connected to the input terminal 54 in the same way as in the charging mode: in that case the load produced by the chain of m capacitor modules 5(*i*) is opposed to the input signal Vbat. Another way to say it is that for the discharging mode they are connected through the first terminal 520 to the input terminal 54, or to the second terminal 530 of a capacitor module 5(*i*) of the same group P that is in series between the considered capacitor module 5(*i*) and the input terminal 54, as in the charging mode.

Thus the intermediate output voltage $V_{LX}$ is equal to the input voltage Vbat minus the load produced by the m capacitor modules 5(*i*) in parallel (m×Vbat/k), which is a (1−m/k) fraction of the input voltage Vbat.

If multiples groups P of m capacitor modules can be formed out of the k loaded capacitors, the different groups P are mounted in parallel between themselves and they are, as a whole, mounted in series between the input terminal 54 and the first circuit node N1.

One can choose m so k−m is equal to j+1 or to j−1. If, in the chosen k capacitor modules 5(*i*), one can do more groups P of m capacitor modules 5(*i*) than groups of (j+1) capacitor modules (or j−1), the multilevel charge pump is preferably adapted to accomplish the first option of the second embodiment of the discharging mode than to accomplish the first embodiment of the discharging mode.

This is especially true if m is equal to 1. In that case, the first option of the second embodiment of the discharging mode can be applied to the main module for two switching ranges. It can be used in a switching range in which the intermediate output voltage $V_{LX}$ switches between (j/k)Vbat and (1−1/k)Vbat, where j/k is equal to 1−2/k or in one in which the intermediate output voltage $V_{LX}$ switches between Vbat and (1−1/k)Vbat.

Figure 5F:
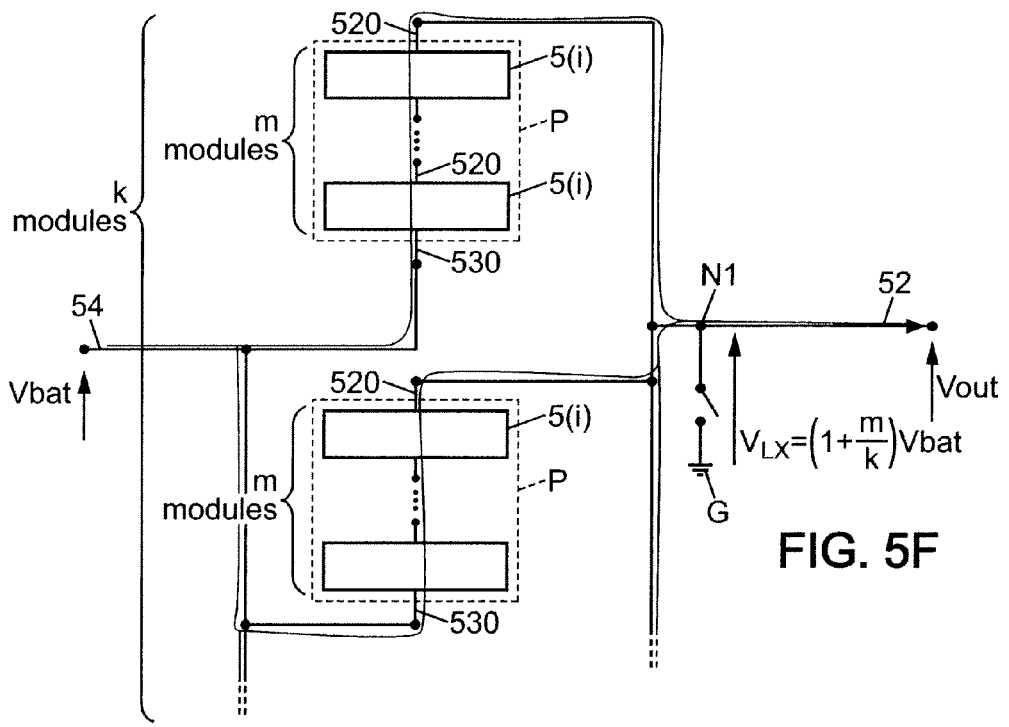

In a second option, the m capacitor modules 5(*i*) are preferably connected to the input terminal 54 in a reverse way compared to the charging mode (FIG. 5F): in that case the load produced by the chain of m capacitor modules 5(i) add itself to the input signal Vbat, the load will be called boost charge. It means that the capacitor modules 5(i) are connected through their second terminal 530 to the input terminal, or to the first terminal 520 of a capacitor module 5(i) of the same group P that is in series between the considered capacitor module 5(i) and the input terminal 54.

As a consequence, the intermediate output signal $V_{LX}$ has a voltage of (1+m/k) Vbat. This discharging mode of the charge pump is called the boost mode.

The boost mode is preferably used in an oscillation level in which the charging mode creates an intermediate output voltage $V_{LX}$ roughly equal to the input voltage Vbat. Thus, it is certain that the perceived intermediate output signal will have a higher value than the input voltage Vbat.

Furthermore, a preferred embodiment is to choose the size of the groups P in boost mode so that the boost charge is as small as possible while being greater than the desired perceived voltage value. When a perceived signal is created by switching between two values, the noise and the ripples are smaller, or the switching frequency can be lower if the two voltages values are as close as possible.

Thus, while the boost charge is greater than the difference between the input signal and the required perceived intermediate output signal, the number k of capacitor modules 5(i) loaded in the charging mode and the number m of capacitor modules in each group are preferably chosen so that the m/k fraction of Vbat is the smallest boost charge possible immediately superior to the desired perceived voltage. As an example, if the input signal is 1V and the desired perceived signal is 1.23 V, depending on the available number of capacitor modules one will advantageously chose a value of k equal to 3 or preferably 4 so the boost charge can be 0.33 V or 0.25 V. Alternatively, the numbers k and m are chosen so that the boost charge is the closest possible to twice the perceived value.

A switching range of the charge pump 56 has already been defined as a working mode of the charge pump in which the intermediate output voltage $V_{LX}$ switches between a first fraction j/k of the input signal Vbat in the charging mode and a second fraction (j+1)/k or (j−1)/k of the signal Vbat in the discharging mode.

It is estimated that a charge pump as described before is adapted to be operated in k+1 different switching ranges if it k capacitor modules are charged during the charging mode. Some switching ranges can be obtained by multiples configuration of charging mode and discharging mode but will be referenced as the same switching range.

For example, switching between 0 and 1/k can be obtain by a charging mode outputting 1/k and a discharging mode outputting 0, or by a charging mode outputting 0 and a discharging mode outputting 1/k through the first embodiment of the discharging mode (+1/k) or by a charging mode outputting 0 and a discharging mode outputting 1/k through the first option of the second embodiment of the discharging mode (1−[k−1]/k).

For ease of understanding we will call the k+1 switching ranges, if k capacitors modules are charged during the charging mode, under the same appellation of a working system.

A charge pump with N capacitors modules 5(i) has N different working systems as the number k of capacitor modules charged in the charging mode may be chosen between 1 and N. Preferably, N is greater than two and at least equal to 3.

Embodiments of Converters/Modulators:

The charge pump 56 of the invention is adapted to be used in a multilevel step-up/step-down converter. It can be done advantageously by connecting a low pass filter to the first circuit node N1.

Said converter is also adapted to be used as a modulator, which is one aspect of an embodiment of the devices of the invention.

In particular, said converter can be used to convert a fixed input voltage Vbat into an amplitude modulated output voltage Vout. The output voltage Vout is a smoothed version of the intermediate output voltage $V_{LX}$ outputted preferably by a multilevel charge pump according to the invention at the first circuit node.

Figure 6:
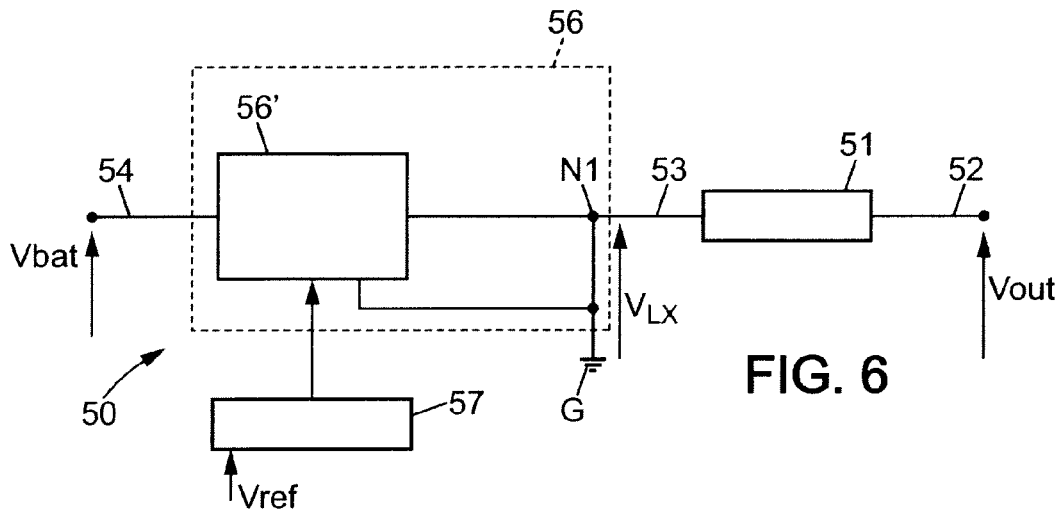
FIG. 6 is a functional view of a multilevel converter according to an embodiment of the invention.

Referring to FIG. 6, there is shown a schematic view of an embodiment of a step-up/step-down converter 50 according to the invention.

This embodiment comprises a low pass filter 51 coupled to an output terminal 52 of the converter 50 where a converted output voltage Vout can be delivered. The low pass filter comprises preferably a power coil L, also know as an inductor, and a capacitor C. The low pass filter 51 is coupled through an internal input terminal 53 to a first circuit node N1 and through the first circuit node N1 and to an input terminal 54 of the converter 50 where the input voltage Vbat can be inputed. The first circuit node N1 is connected to the input terminal 54 by means of a pulse width modulating module 56, called PWM module, able to output to the first circuit node N1 an intermediate output signal $V_{LX}$ converted from the input signal Vbat. Last, the PWM module 56 and the first circuit node are connected to the ground. All the aforementioned connections comprise switches that are able to interrupt each connection independently, the switches are not represented.

The PWM module 56 can be adapted to output, at the first circuit node N1, an intermediate output voltage $V_{LX}$ that switches at least from a first voltage value and a second voltage value, defining a switching range. The first and second voltage values are both fraction of the input voltage Vbat such that the absolute difference between the first and second voltage value is inferior or equal to half the input voltage. The PWM module is adapted to be able to operate in at least two switching ranges. Preferably, if there are more than three switching ranges, the PWM module 56 is adapted to operate so that for at least one range, one of the first and second values is higher than the input voltage.

The PWM module 56 is preferably an embodiment of the charge pump 56 described before.

In a preferred embodiment the multi-level charge pump 56 can be programmed by a master module 57. The master module 57 is adapted to decide which switching range is to be activated and possibly at which duty cycle and it is adapted to transmit a corresponding command to the charge pump or directly to the switches. Advantageously the master module 57 directly controls the switches. Alternatively, the master module 57 only decides the switching range and possibly the duty cycle, and the charge pump 56 controls itself the switches.

The master module is advantageously adapted to decide if the switching range or the duty cycle have to be changed and it is adapted to transmit a corresponding command to the charge pump or directly to the switches.

In an embodiment, the master module 57 is adapted to decide of a change of switching range, or of its duty-cycle, in accordance with a reference signal Vref. The reference signal Vref is preferably representative of a desired value for the output voltage Vout. As such, and to limit confusion with the reference voltage Vg representative of the ground, it will thereafter be referenced to as a "desired output voltage Vref".

The master module 57 is adapted to choose an ideal switching range, using any k capacitor modules 5(i) from the N available capacitor modules 5(i), for any desired output signal Vref. Then the master module 57 can command the necessary small switches in order to accomplish the different couplings rendered necessary to accomplish the chosen switching range.

Figure 7:
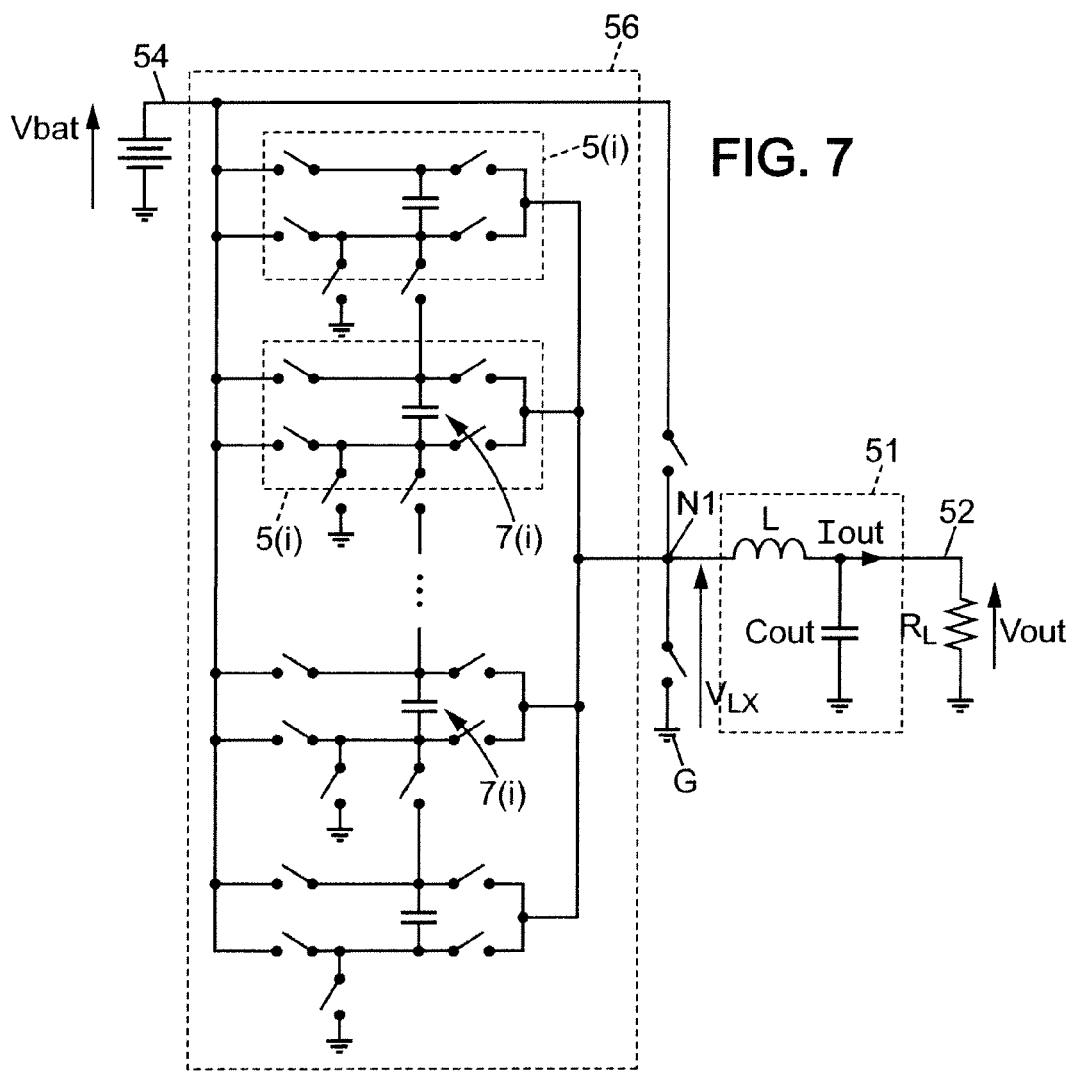
FIG. 7 is a detailed schematic view of a multilevel converter according to an embodiment of the invention.

FIG. 7 shows a general circuit of an embodiment of a multi-level Step-Up/Down converter. The charge pump 56 represented here has N capacitor modules 5(i), each comprising at one capacitor 7(i) and a few switches, in order to generate at least N+2 intermediate output voltage $V_{LX}$ values ranging from 0 to Vbat+Vbat/k. The capacitors 7(i) are a main functioning part of the capacitor modules 5(i) and as such, only the capacitor 7(i) will be discussed thereafter.

The person skilled in the art will understand that any forecoming mention of a capacitor 7(i) is also representative of a capacitor module 5(i). As such, in some embodiments, any capacitor 7(i) mentioned thereafter may to be replaced by an assembly of components adapted to function as an indivisible capacitor module in the sense of the invention. The assembly of components may comprise a group of smaller capacitors in series, in parallel, or even other electric or electronic components such as transistors . . . .

The PWM signal created at the first circuit node by the switching of the intermediate output voltages $V_{LX}$ is filtered by an LC filter (L, $C_{OUT}$). The output voltage Vout is thus roughly equal to a mean of the intermediate output signal $V_{LX}$.

A converter 50 according to an embodiment of the invention may be described as a Step-Down converter 51 in which the entry is a multilevel charge-pump 56.

The capacitors 7(i) are charged in series in a first mode of operation, called charging mode, with a stored charge and are discharged in groups in parallel in a second mode of operation, called discharging mode. Those groups may consist of only one capacitor 7(i) or they may comprise more than one capacitor 7(i). In general, the charge pump 56 may be configured to use a discharging mode that allows forming at least 2 groups of capacitor 7(i) as seen before in relation to the description of the multilevel charge pump.

In the discharging mode, the stored charge, generally a voltage stored by the capacitors 7(i), is used to generate one of N+2 voltages values for the intermediate output voltage $V_{LX}$, between Vbat+Vbat/N and 0 V. The capacitors 7(i) are arranged in series into groups P so that each group produces a discharging voltage, called "load" thereafter, greater than the individual stored charge. The load is outputted directly to the first circuit node N1 as the intermediate output voltage $V_{LX}$ or as an addition or as a reduction to the input voltage Vbat.

In a boost mode, a discharging mode, outputting a voltage of Vbat+Vbat/N, may also be generated. Thus a PWM signal is generated by switching from a charging mode outputting a first voltage value of Vbat to a discharging mode outputting a voltage value of Vbat+Vbat/N. In that case, the mean value of the PWM signal has an output voltage Vout higher than the input voltage Vbat.

By switching between two voltage values for the intermediate output voltage $V_{LX}$, by choosing the duty cycle of the PWM signal, and then by filtering the PWM signal through a low-pass filter, one may produce a mean output voltage Vout of any wanted voltage comprised between 0 V and Vbat+Vbat/n.

Figure 8:
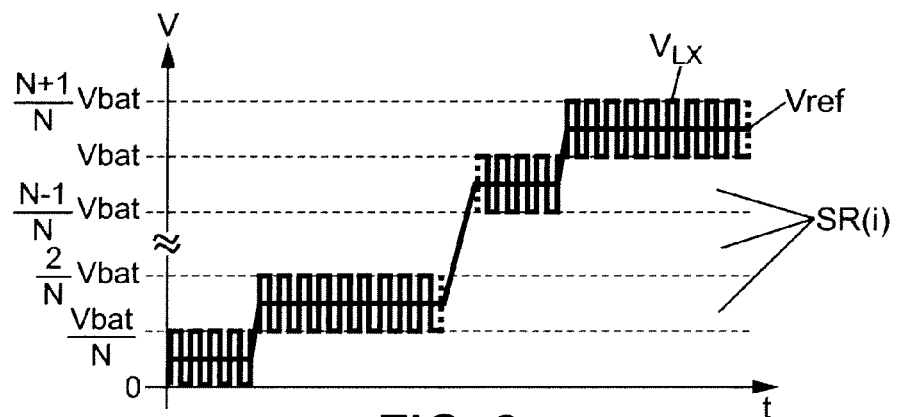
FIG. 8 is a diagram showing comparatively an intermediate output voltage of the invention $V_{LX}$ forming a PWM signal and a desired output signal Vref.

FIG. 8 illustrate a diagram with the time in abscise and the intermediate output voltage VLX in ordinate. N+1 switching ranges SR(i) are shown. An output voltage Vout, modulated through multiples switching ranges SR(i) is represented. A corresponding PWM signal obtained with a charge pump according to an embodiment of the invention is represented.

The PWM signal goes through multiples switching range SR(i), one after the other, to comply with a desired output signal Vref. The first and second voltages values of each switching ranges SR(i) are as close as possible to the output voltage Vout so that the amplitude of the PWM signal is as small as possible considering the available values for the intermediate output voltage $V_{LX}$.

Figure 9:
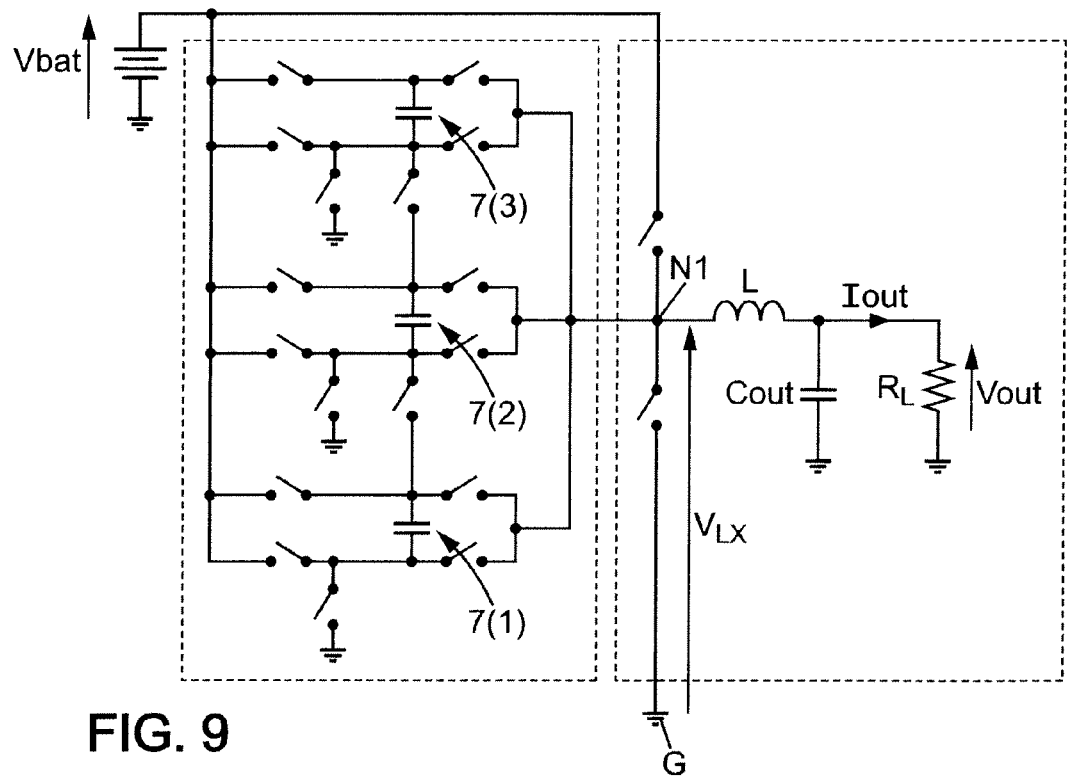
FIG. 9 is a schematic view of a multilevel converter according to an embodiment of the invention comprising three capacitor modules.

Working the Modes of Operation: Example with 3 Capacitor Modules:

In order to further explain some of the embodiments of the invention, a practical example with a multilevel charge pump comprising n=3 capacitors is presented (FIG. 9), but additional embodiments with more or less capacitors may by implemented as was presented before. It is understood here that n=3 and k=n as all available capacitors 7(i) are charged during the charging mode.

The converter is adapted to operate according to three switching ranges plus an additional boost switching range by selectively switching the switches as shown later.

Figure 10A:
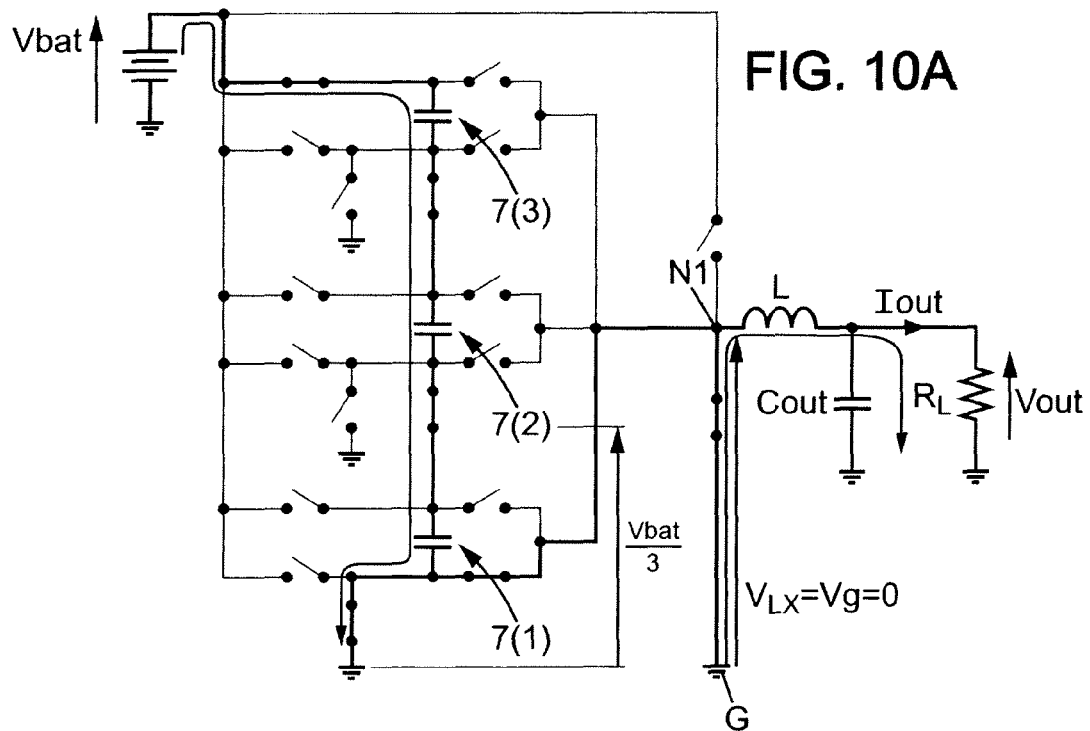
FIGS. 10A and 10B are schematic views of modes of operation of a multilevel converter according to an embodiment of the invention comprising three capacitor modules for a first switching range.
Figure 10B:
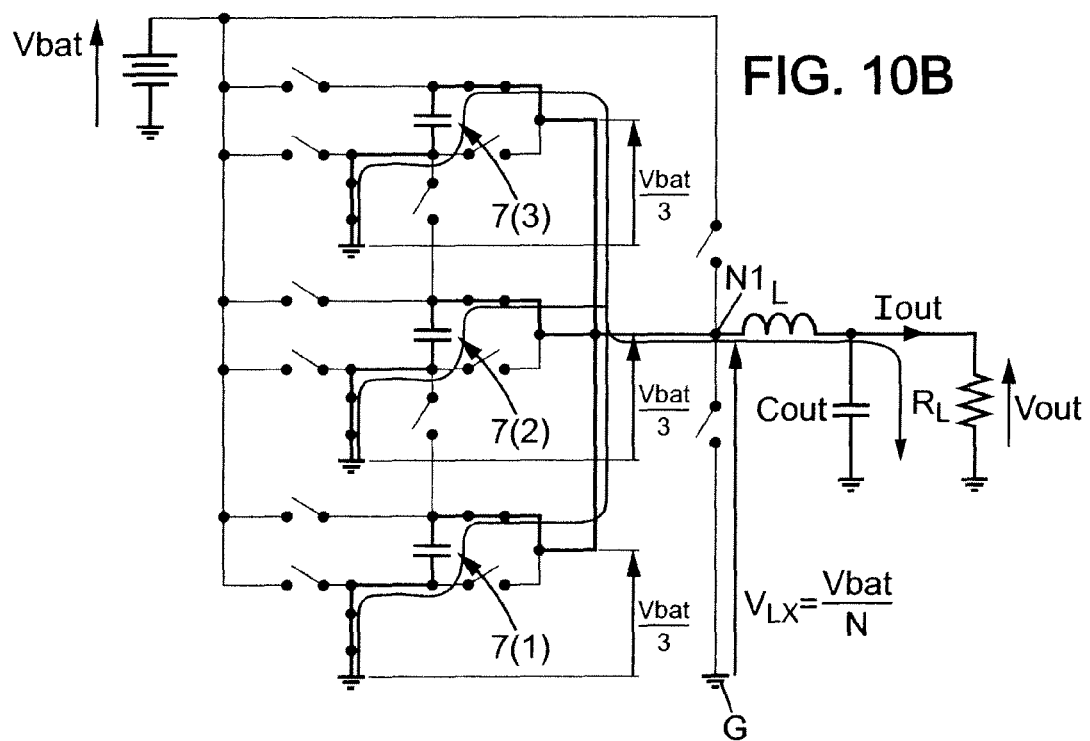

FIGS. 10A and 10B show the generation of the first switching range, in which intermediate output voltage $V_{LX}$ is switching between ground (0V) and Vbat/3.

During a first phase, the charge pump 56 is in its charging mode, (FIG. 10A) at the first circuit node N1 is at an intermediate output voltage $V_{LX}$ equal to 0V (as it is directly connected to the ground), the capacitors 7(i) (7(1), 7(2) and 7(3) are all connected in series between the input terminal 54, inputting an input voltage Vbat, and the ground G and are storing power from the input signal. The amount of power stored in each capacitor 7(i) is called thereafter a "stored charge". For each capacitor 7(i), the stored charge is equal to Vbat/3.

And output current Iout flows from the ground G to the exit terminal 52 through a direct connection between the ground G and the first circuit node N1, and then through some small switch and through an inductor L. This connection may be done trough the charge pump by connecting the first circuit node N1 to an internal node N(i) situated between the last capacitor 7(3) and the ground G or by a direct connection 81 to the ground G.

During a second phase, the charge pump is in discharging mode (FIG. 10B). The capacitors 7(i) are all connected in parallel between the first circuit node N1 and the ground. The switches are connected so as to create a low resistive path to from each capacitor to the first circuit node N1. The intermediate output voltage $V_{LX}$ is roughly equal to Vbat/3.

An output current Iout flows from the capacitors 7(i) to the exit terminal 52 through the switches and through the inductor L.

Figure 11A:
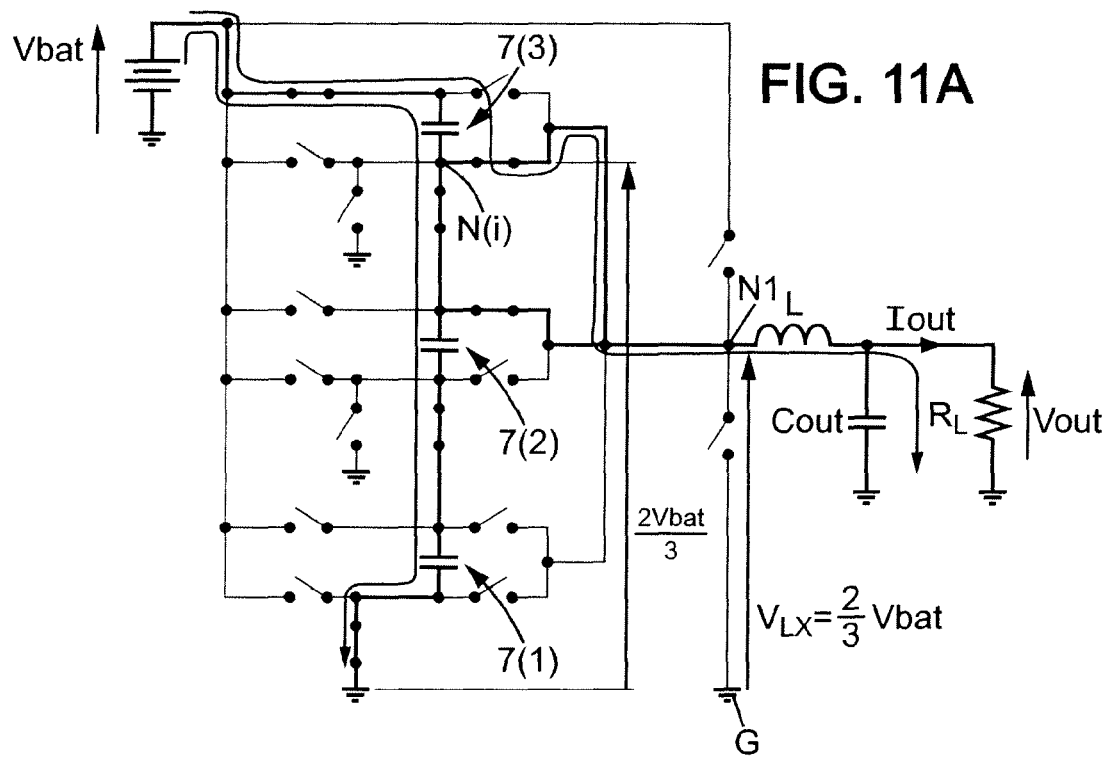
FIGS. 11A and 11B are schematic views of modes of operation of a multilevel converter according to an embodiment of the invention comprising three capacitor modules for a second switching range.
Figure 11B:
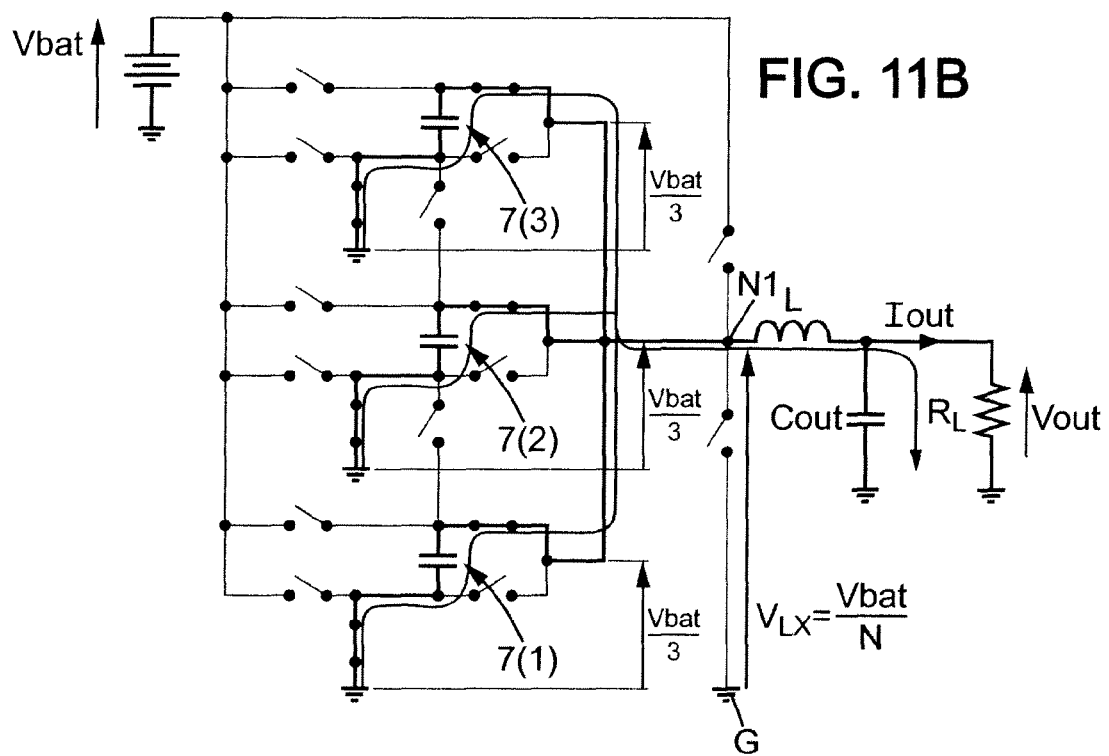

FIGS. 11A and 11B show the generation of a second switching range in which the intermediate output voltage $V_{LX}$ switches roughly between Vbat/3 and ⅔Vbat.

During a first phase, the charge pump 56 is in its charging mode (FIG. 11A). All the capacitors 7(i) are connected in series between Vbat and the ground and energy is stored into the capacitors to form a global loaded charge. For each capacitor 7(i), the stored charge is equal to Vbat/3. At the same time, the switches are activated in such a way that the first circuit node N1 is connected to the ground through two thirds of the capacitors 7(i). As there are only 3 capacitors 7(i), it means that the first circuit node N1 is connected to an internal node N(i) positioned between the third capacitor 7(3) and the second capacitor 7(2). The third capacitor 7(3) is thus connected in series between the input terminal 54 and the first circuit node N1 and between the input terminal 54 and the ground through the other two capacitors. The two other capacitors 7(1) and 7(2) are connected in series between the ground and the input terminal through the third capacitor 7(3) and between the ground and the first circuit node N1.

As a consequence, the intermediate output voltage $V_{LX}$ at the first circuit node N1 is roughly equal to ⅔ of the input voltage Vbat.

An output current Iout flows from the input terminal 54 to the exit terminal 52 through the capacitor 7(3) and the inductor L.

During a second phase, the charge pump 56 is in discharging mode (FIG. 11B). The small switches are positioned in the same arrangement as the one illustrated in relation to FIG. 10B as the desired an intermediate output voltage $V_{LX}$ has the same value of Vbat/3.

The output current Iout flows from the capacitors 7(i) to the exit terminal 52 through the switches and through the inductor L.

Thus, the intermediate output voltage $V_{LX}$ switches between a first voltage value of ⅔Vbat during the charging mode and a second voltage value of ⅓ Vbat during the discharging mode, which brings the same results as switching between a charging mode outputting ⅓Vbat and a discharging mode outputting ⅔ Vbat while being easier to produce.

Figure 12A:
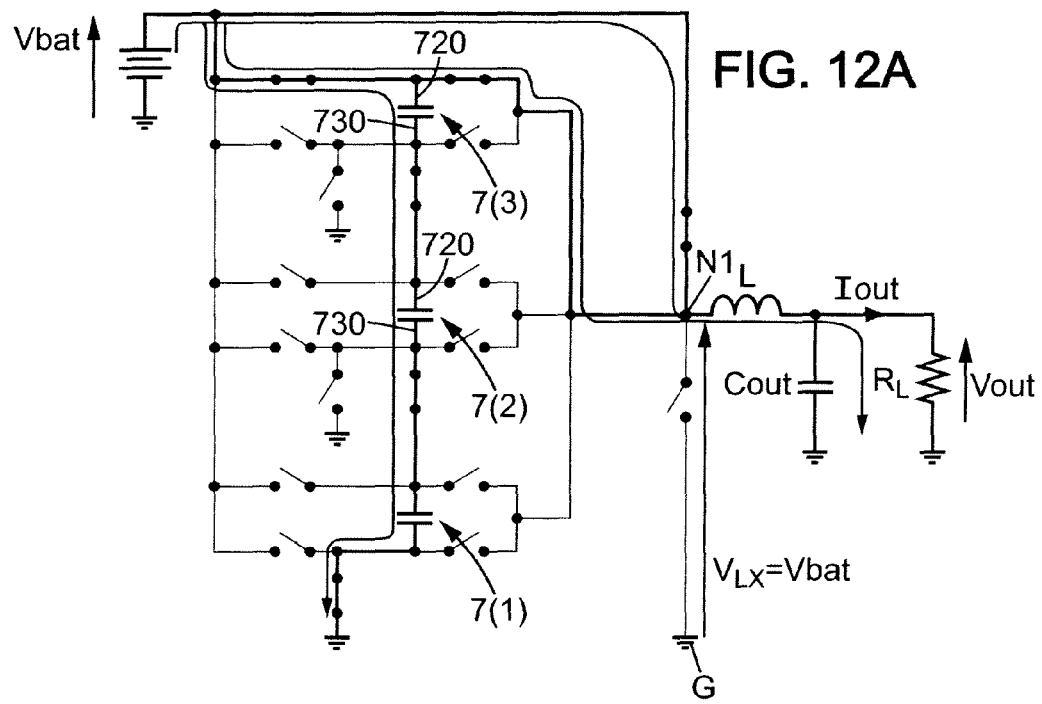
FIGS. 12A and 12B are schematic views of modes of operation of a multilevel converter according to an embodiment of the invention comprising three capacitor modules for a third switching range.
Figure 12B:
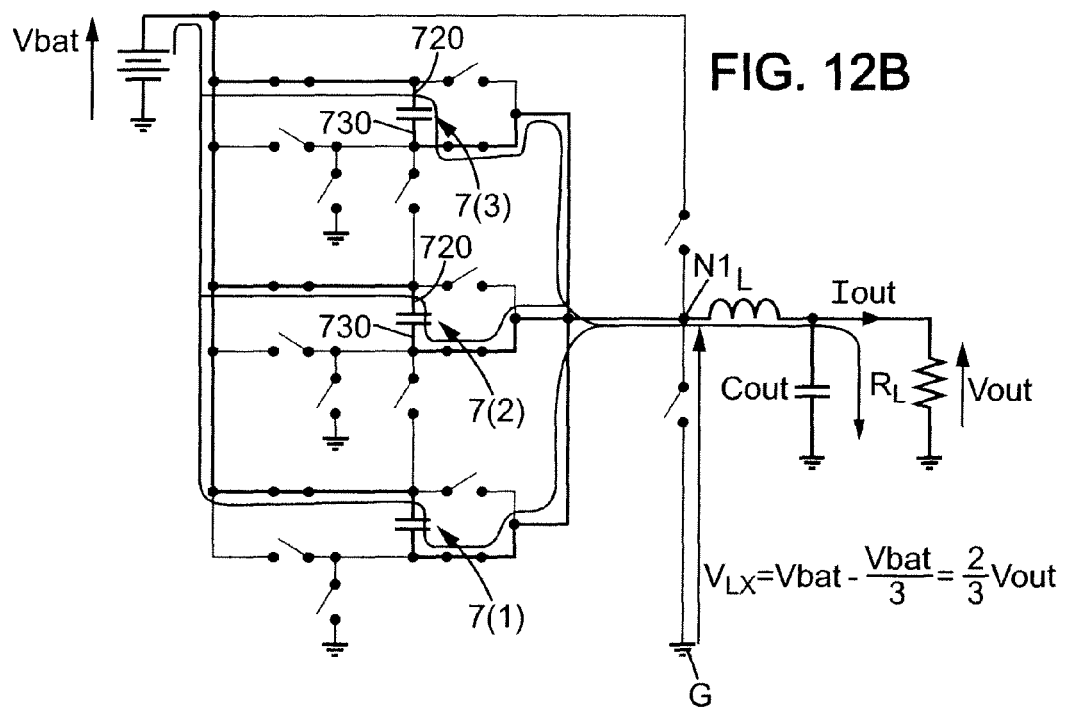

FIGS. 12A and 12B show the generation of a third switching range in which the intermediate output signal $V_{LX}$ switches between ⅔Vbat and Vbat.

During a first phase, the charge pump 56 is in its charging mode (FIG. 12A). The capacitors 7(i) are connected in series between the input terminal 54 and the ground and they are thus storing the aforementioned stored charge. For each capacitor 7(i), the stored charge is equal to Vbat/3. The first circuit node N1 is directly connected to the input terminal 54. Thus the intermediate output voltage $V_{LX}$ at the first circuit node N1 is roughly equal to the input voltage Vbat.

The output current Iout flows from the input terminal 54 to the exit terminal 52 through some switches and the inductor L.

During the second phase the charge pump is in discharging mode (FIG. 12B). The capacitors 7(i) are all connected between the input terminal 54 and the first circuit node N1. The switches are connected in such a way that the capacitors 7(i) are mounted in parallel with each others. The switches are connected in a way such as to create a low resistive path from the capacitors 7(i) to the first circuit node N1. The switches are further connected in such a way that the stored charge opposes the input signal Vbat. A preferable way to do it is illustrated in FIG. 12B: the first terminal 720 of each capacitor 7(i) that was connected to the input terminal during the charging mode is connected to the input terminal 54 and the second terminal 730 of each capacitor 7(i) that was connected to the ground during the charging mode is now connected to the first circuit node N1. As a consequence, the intermediate output voltage $V_{LX}$ node is equal to Vbat minus Vbat/3 which is ⅔Vbat.

The output current Iout flows from the capacitors 7(i) to the exit terminal 52 through some switches and the inductor L.

Thus, the intermediate output voltage $V_{LX}$ switches between a first voltage value of Vbat during the charging mode and a second voltage value of ⅔Vbat during the discharging mode, which brings the same results as switching between a charging mode outputting ⅔Vbat and a discharging mode outputting Vbat.

Figure 13A:
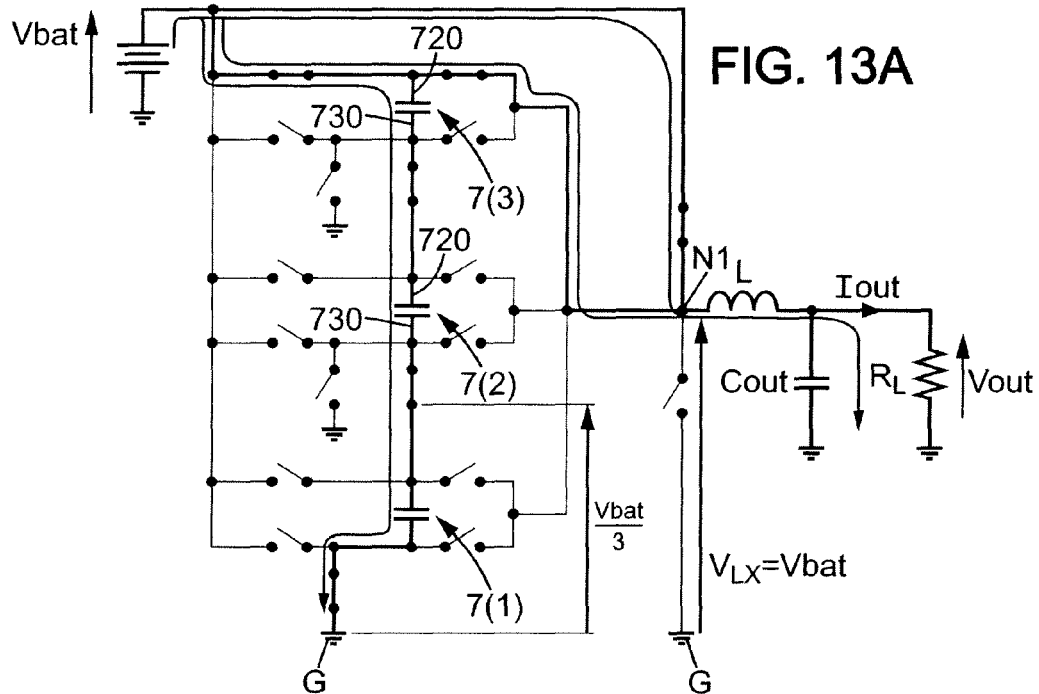
FIGS. 13A and 13B are schematic views of modes of operation of a multilevel converter according to an embodiment of the invention comprising three capacitor modules for a fourth switching range.
Figure 13B:
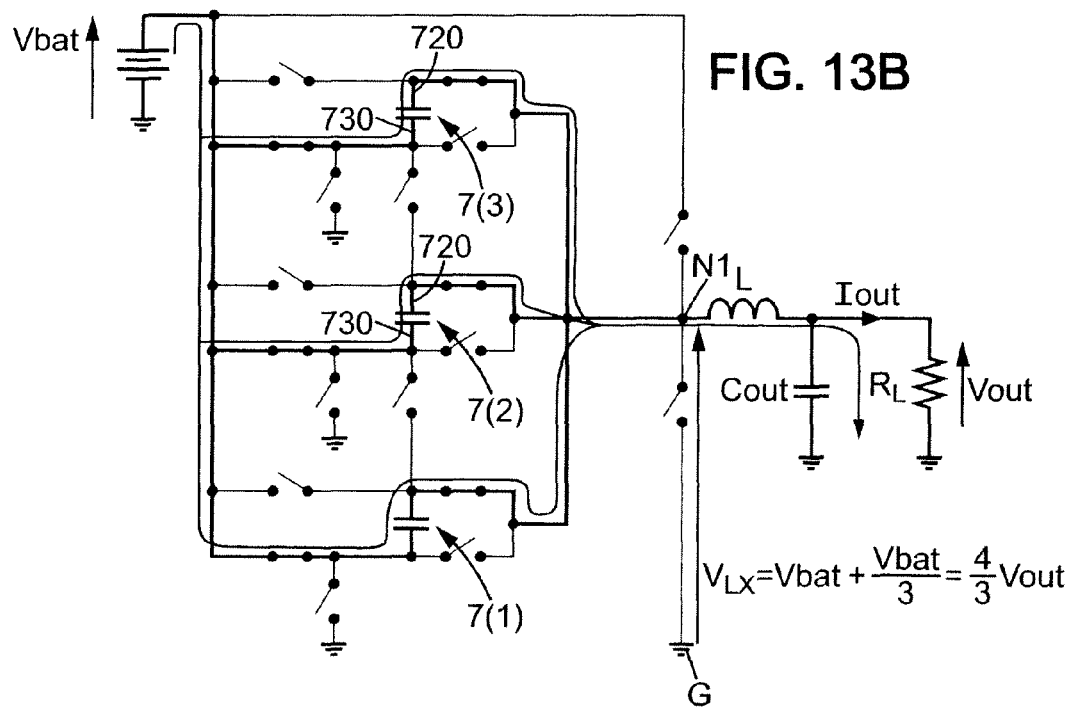

FIGS. 13A and 13B show the generation of a fourth switching range in which the intermediate output voltage $V_{LX}$ switches between Vbat and Vbat+Vbat/3.

The first phase is identical to the first phase of the third switching range; each capacitor is being charged with a stored charge of Vbat/3 and the voltage of intermediate output signal $V_{LX}$ is equal to the voltage of the input signal Vbat.

The output current Iout flows from the input terminal 54 to the exit terminal 52 through some switches and the inductor L.

The second phase is almost identical to the first phase of the third switching range. The only difference is that the switches are connected in such a way as to make the stored charge add itself the input signal Vbat. A preferable way to do it is illustrated in FIG. 12B: the first terminal 720 of each capacitor 7(i) that was connected to the input terminal during the charging mode is now connected to the first circuit node N1 while the second terminal 730 of each capacitor 7(i) that was connected to the ground during the charging mode is now connected to the input terminal 54. As a consequence, the intermediate output voltage $V_{LX}$ node is roughly equal to Vbat with an additional Vbat/3, which is Vbat+Vbat/3.

The output current Iout flows from the capacitors 7(i) to the exit terminal 52 through some switches and the inductor L.

Thus, the intermediate output voltage $V_{LX}$ switches between a first voltage value of Vbat during the charging mode and a second voltage value of Vbat+Vbat/3 during the discharging mode.

This switching range is used only if an output voltage Vout having a voltage greater than the input voltage Vbat is desired.

Figure 14:
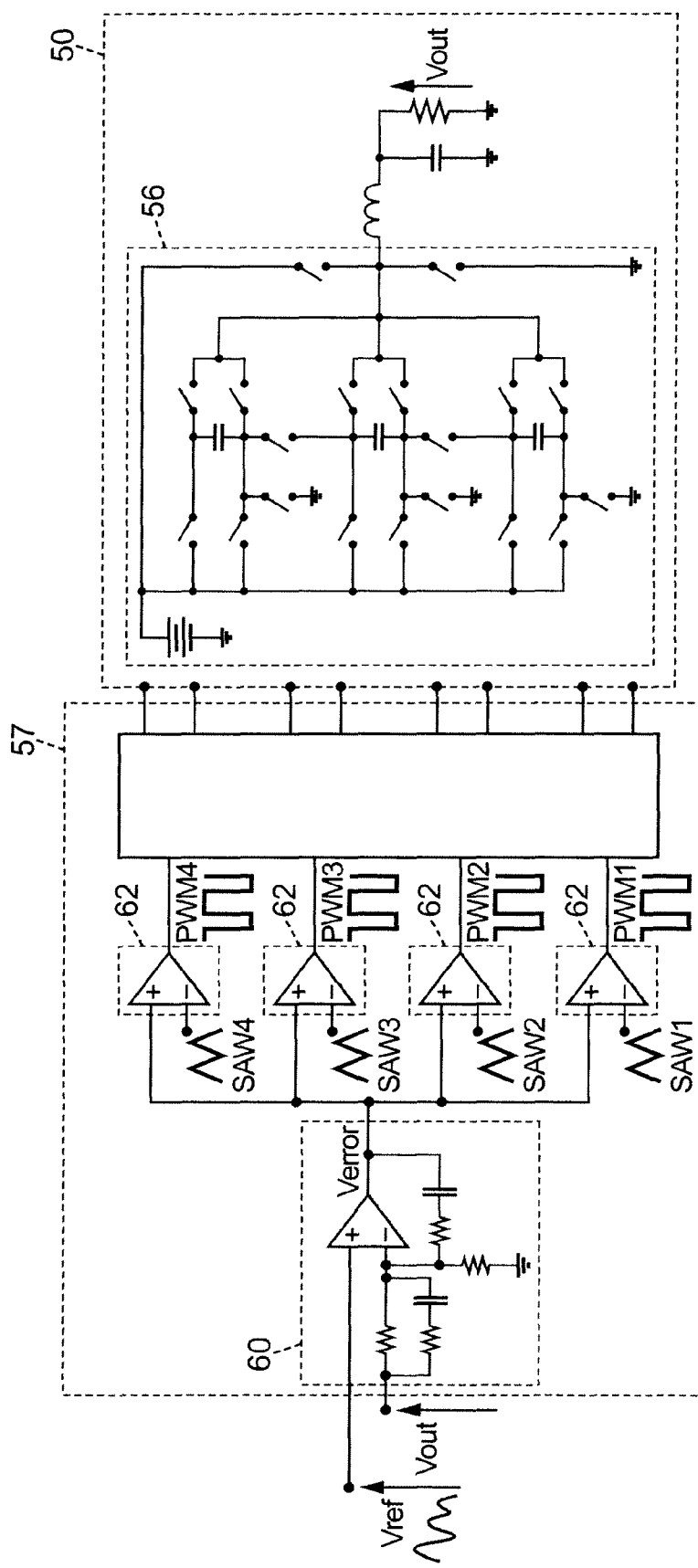
FIG. 14 is a detailed schematic view of a multilevel converter according to an embodiment of the invention comprising three capacitor modules to which is added a master module to control the charge pump of the invention.

Embodiments with External Control by a Master Module:

As was presented before, a preferred embodiment of the converter according to the invention comprise a master module 57. An advantageous use of the converter is in a closed-loop mode (FIG. 14). It means that the aforementioned reference signal Vref is used by the master module 57 to decide which switching range of the charge pump to use. The reference signal Vref may be a either a modulated signal or a constant value signal. In practice, the reference signal is preferably representative of a desired value of the output voltage Vout.

The master module 57 is then adapted to calculate a difference between the output signal Vout and the desired output signal Vref and dictate the switching range of the charge pump 56 or modify the duty cycle in order to reduce this difference. This difference may be processed by the way of an error signal Verror. To calculate the error signal Verror, the master module 57 makes use of an error amplifier 60 using the output signal Vout and the desired output signal Vref as inputs.

The error amplifier 60 has preferably both a high gain and a large bandwidth in order to cope with envelope tracking requirements.

Figure 15:
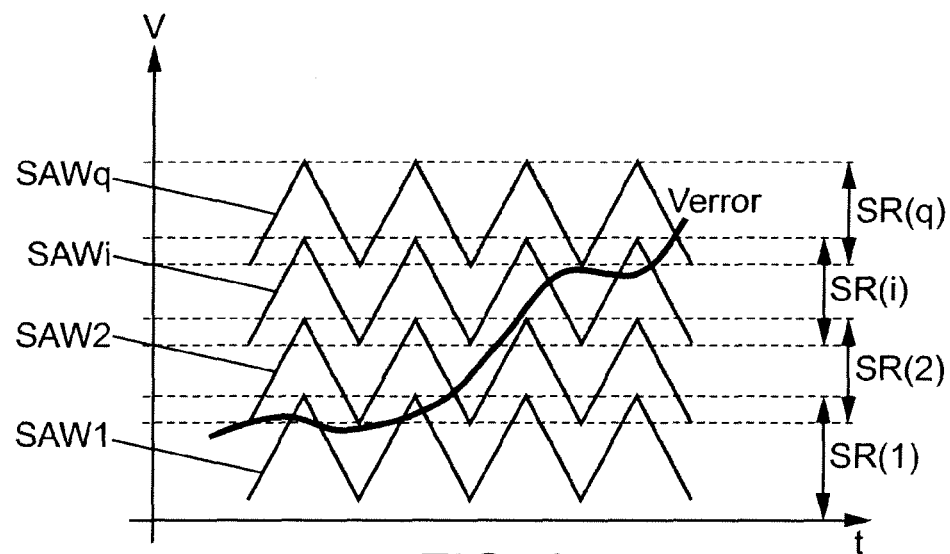
FIG. 15 is a diagram showing an embodiment of comparison of an error signal Verror to four overlapping saw signals.

In a preferred embodiment of the master module 57, illustrated in FIG. 14 and FIG. 15, the error signal Verror at the output of the error amplifier 60 is then compared to q overlapped saw signals (SAW 1 to SAWq) trough q comparators 62. q is equal to the number of switching ranges available by the charge pump 56.

In a preferred embodiment, the charge pump will always charge all the N available capacitors. In which case, the charge pump will use only one working system and have N+1 switching ranges. As a consequence, all the levels available to the intermediate output signal are multiples of 1/N, and q=N.

In an alternative embodiment, the master module 57 is able to command the charge pump 56 to commute from one working system to another working system. Thus the charge pump will function with switching ranges that do not use the same number of capacitor modules in the charging mode, and thus does not charge the capacitor modules with the same stored charge.

For example, in case the charge pump has 4 capacitor modules available, the master module may decide to use alternatively, when judged better, switching ranges from the working system using 4 capacitor modules and switching ranges form the working system using 3 capacitor modules. Eg, the pump charge first switches between 0 and ¼, next switches between ¼ and ½, next switches between ⅓ and ⅔, next switches between ½ and ¾ . . . etc. The use of switching ranges with amplitudes that are bigger than for another switching range may be used to output steep signal changes quicker than when using only switching ranges of the same amplitude.

The output of each comparator module 62 is preferably a PWM signal (PWM 1 to PWM 4) that controls the switching from the charging mode of one switching range to the discharging mode of the same switching range. As a result, the PWM signal controls the intermediate output signal $V_{LX}$ switching levels. In a preferred embodiment, the comparators 62 comprise q overlapping saw signals that are compared to the error signal Verror.

The q saw signals represents, each for a given switching range, the theoretical commutation between charging mode and discharging mode. When the error signal Verror intersect any of the q saw signals, the comparator modules 62 detects it and the master module 57, for example directly by the comparator modules 62, outputs a command to either activate the charging mode of the switching range commanded by said saw signal, or to activate the discharging mode of said switching range.

Figure 16:
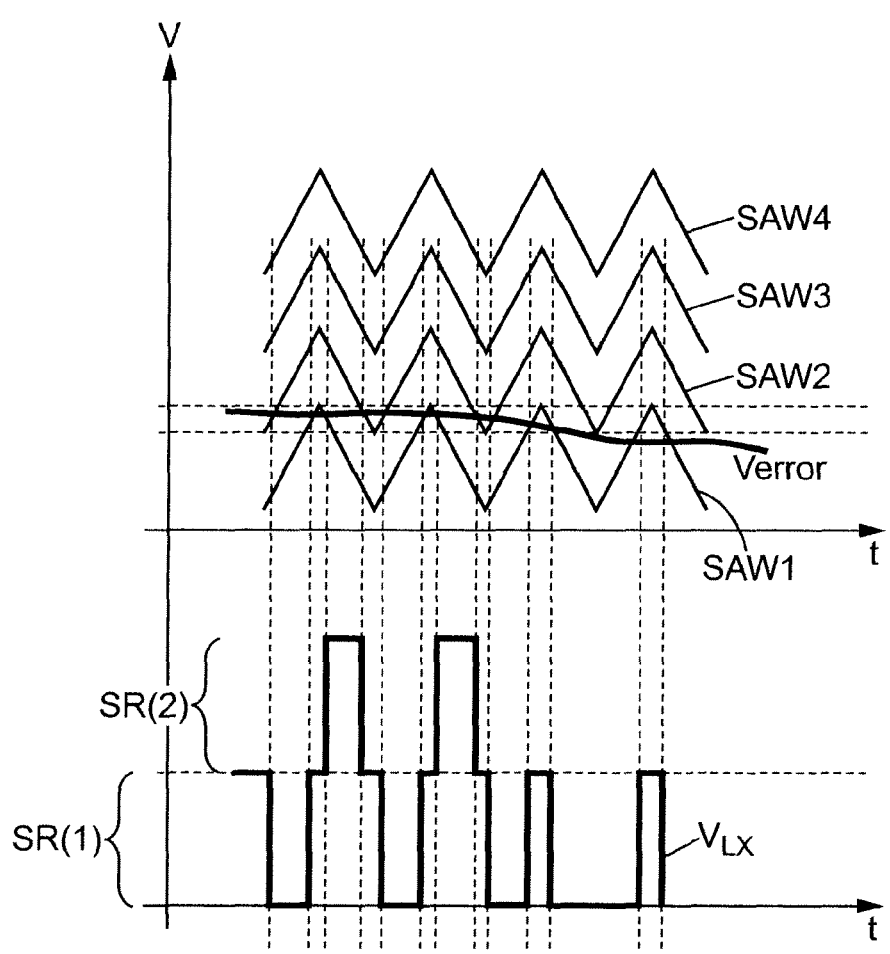
FIG. 16 is a diagram representing a correspondence between the comparison of the error signal and the saw signals and the intermediate output signal $V_{LX}$.

As the q saw signals are overlapping, the error signal Verror, while only intersecting one saw signal at a time, can be in the range of two saw signals at a given time. When the error signal is in the range of two saw signals, two switching ranges are active in the same switching period and the master module 57 output commands so that one or more cycles of one of the two switching ranges are inserted in the middle of a cycle of the other of the two switching ranges (FIG. 16). The intermediate output voltage $V_{LX}$ therefore switch smoothly from two switching ranges (SR1 and SR 2 in the example of FIG. 16).

Using preferably overlapping saw signals, there is only one control loop to command all switching ranges available.

Performances:

The step-down/step-up converter according to embodiments of the invention has less ripples, or smaller ripples than a DC-DC converter according to the prior art, as it operates with small switching ranges adapted to each desired output voltage value:

Equation 5 and equation 6 show mathematical expressions for the ripple (ΔI) seen in the current in the inductor $I_{LSD}$ for respectively a Step-Down and a Multi-Level converter according to an embodiment of the invention:

$$\Delta I_{L_{SD}}(\text{for Step} - \text{Down}) = \frac{D \cdot (1-D)}{L_{SD} \cdot f_{SW}} V_{BAT} \quad (\text{Eq. 5})$$

$$\Delta I_{L_{SD}}(\text{for Multi} - \text{Level}) = \frac{1}{k} \cdot \frac{D \cdot (1-D)}{L_{SD} \cdot f_{SW}} V_{BAT} \quad (\text{Eq. 6})$$

The ripple in the current of the inductor $I_{LSD}$, representative of the ripple in the output current, is divided by a factor k (k being the number of switching range available in a single working system, not counting the boost mode) in the case of Multi-Level converter.

The calculations were not done for the alternative preferred embodiment in which the master module is adapted to command the charge pump to switch between different working systems.

A comparable attenuation is found when the ripples associated to the output voltage are calculated. Equation 7 and equation 8 show mathematical expressions for the ripple (ΔVout) seen in the exit terminal for respectively a Step-Down and a Multi-Level converter according to an embodiment of the invention:

$$\Delta V_{OUT}(\text{for Step} - \text{Down}) = \frac{D \cdot (1-D)}{8 \cdot L_{SD} \cdot C_{OUT} \cdot f_{SW}^2} V_{BAT} \quad (\text{Eq. 7})$$

$$\Delta V_{OUT}(\text{for Multi} - \text{Level}) = \frac{1}{k} \cdot \frac{D \cdot (1-D)}{8 \cdot L_{SD} \cdot C_{OUT} \cdot f_{SW}^2} V_{BAT} \quad (\text{Eq. 8})$$

If the ripples on the output voltage are already low enough for technical specifications using a classical converter, the multi-level converters according to embodiments of the invention may be also used to either reduce the inductance of the power coil, which is useful for integration and cost reduction or reduce the switching frequency $f_{SW}$, which increases efficiency and reduces risks of interferences with RF signals.

Figure 17:
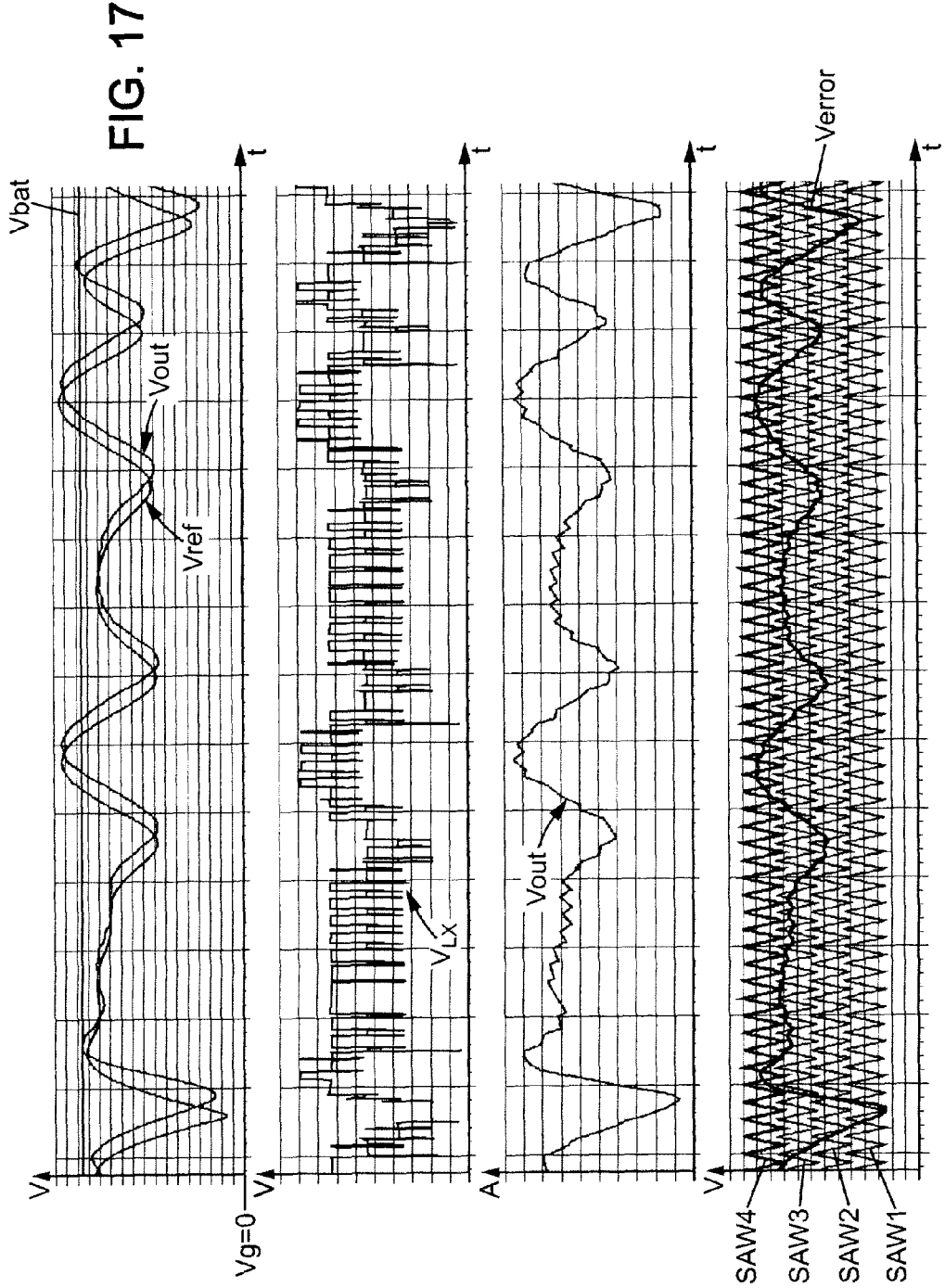
FIG. 17 is a diagram showing the results of a close-loop simulation of a converter according to an embodiment of the invention.

FIG. 17 shows results of the performances of a multi-level converter according to one embodiment of the invention in closed loop mode with a modulated reference signal Vref. The reference signal Vref in this simulation is shaped like an envelope with wide bandwidth (>4 MHz) from a Wideband Code Division Multiple Access signal (WCDMA signal).

The multi-level converter has been simulated in Step-Up/Down mode in which the desired output voltage Vref is sometimes superior to the input voltage Vbat that is supplied by a standard battery. Thus, every switching ranges are evaluated, even the boost mode.

The simulation setup are such that Vbat is 2.7 V, Iout is 560 mA, Vref is at maximum value equal to 3.1 V, and a root mean square (rms) close to 2.2 V, the low pass filter has a capacitor $C_{OUT}$ of 10 nanofarad (nF) and an inductor $L_{SD}$ of 220 nanohenry (nH); the capacitors of the charge pump are chosen with a capacitance of 1 microfarad. Eventually, the switching frequency $f_{SW}$ for switching from the charging mode to the discharging mode is chosen as 20 megahertz (MHz)

As a result, one observes that using the multi-level converter according to one embodiment of the invention instead of a classic step-down converter produces a reduction in ripple amplitude when using the same value for both the inductor $L_{SD}$ and the switching frequency $f_{SW}$.

Ripple Comparison: Simulation Results

Figure 18:
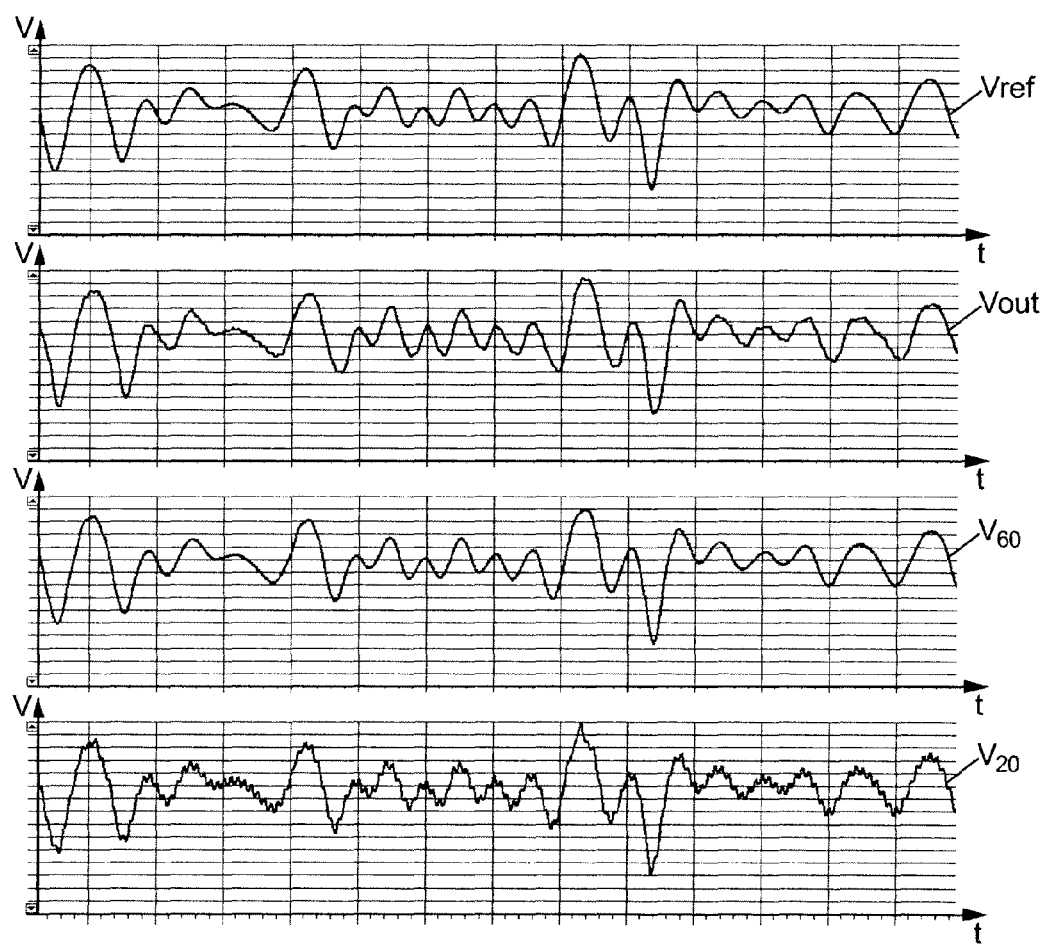
FIG. 18 is a diagram showing comparing the voltage results of the close-loop simulation of a converter according to an embodiment of the invention to state of the art converters.
Figure 19:
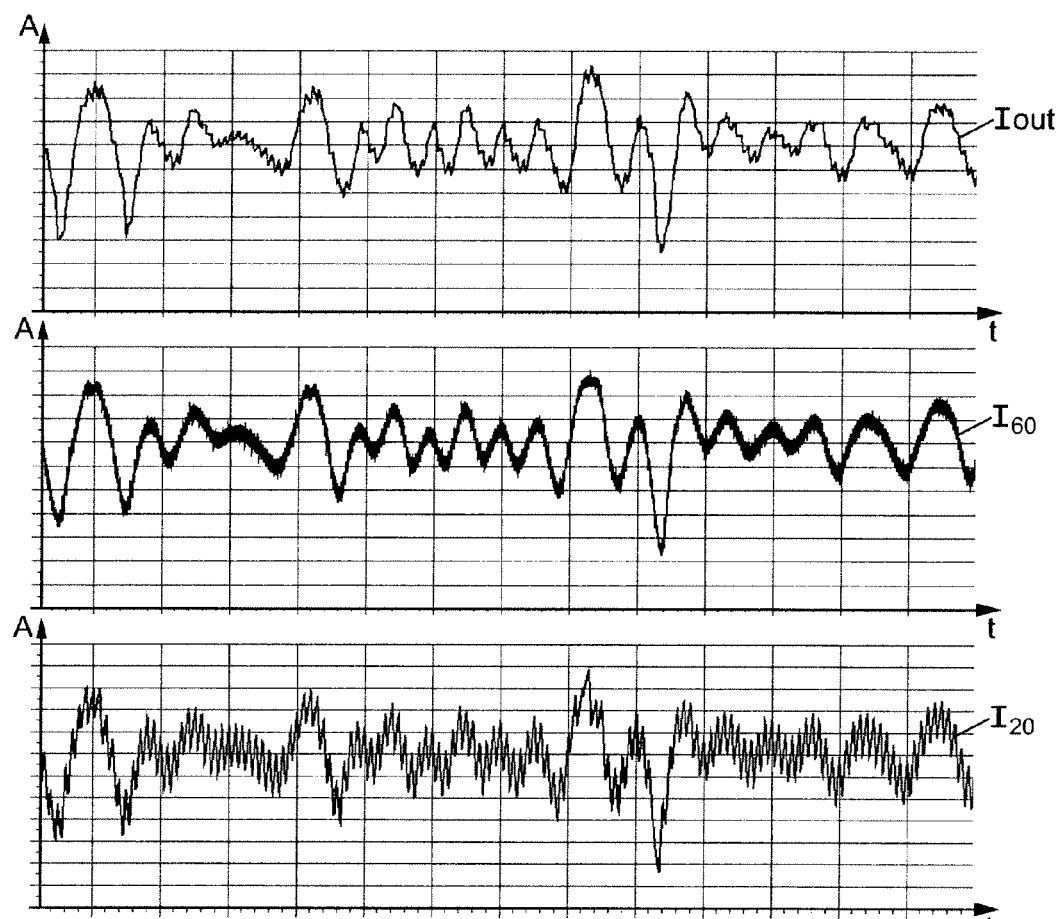
FIG. 19 is a diagram showing comparing the current results of the close-loop simulation of a converter according to an embodiment of the invention to state of the art converters.

FIGS. 18 and 19 show simulation results for comparison of ripples produced in the output signal. FIG. 18 is focused on comparison of ripples created in the output voltage Vout, whereas FIG. 19 is dedicated to comparison of ripples in the output current Iout. Three kinds of converters have been simulated: a 3-Level converter according to one embodiment of the invention using a switching frequency of 20 MHz and generating an output voltage Vout, a classical Step-Down converter using a switching frequency of 60 MHz generating an output voltage V60 and a classical Step-Down converter using a switching frequency of 20 MHz generating an output voltage V20.

The results illustrate that a 3-level converter using a switching frequency of 20 MHz generates roughly the same amount and size of ripples as a classical Step-Down converter switching at 60 MHz and less ripples than a classical Step-Down converter switching at 20 MHz.

The embodiments previously described allow for building converters with a high bandwidth capability, able to output signals (Vout and Iout) with fewer ripples or using lower switching frequency or smaller power coil than most know DC-DC converters. The multi-level converter according to embodiments of the invention can output a continuous output current (Iout) and it can either output lower voltages than the supply voltage or higher voltages than the supply voltages. The outputted voltage can evolve dynamically very quickly to produce any modulated signal.

Embodiments of the invention may be applied to application such as DC-DC power conversion for cellular phones and portable applications, for example for portable device using low cutoff battery technologies, roughly between 2.3 V-2.7 V. Some of those applications can be high bandwidth envelope tracking or polar modulation for RF power amplifiers, even in case where a higher voltage than the supply voltage needs to be outputted. It also may be used for low ripple applications, reducing the switching frequency or the size of the inductor of the low pass filter.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A device for converting an input signal having a given input voltage into an output signal having an output voltage different from the input voltage, the device comprising:
   an input terminal adapted to receive the input signal;
   an output terminal coupled to a first circuit node and adapted to output the output signal converted from the input signal, wherein the output signal voltage is within one of two or more switching ranges defined by configurations of capacitors in a main module, and wherein the value of the output signal voltage within each switching range is defined by a duty cycle of a pulse-width-modulated (PWM) signal generated by the main module;
   the main module disposed operatively between the input terminal and the first circuit node, the main module adapted to output, at the first circuit node, a PWM signal by operating in at least two modes of operation with a given duty cycle, the PWM signal switching with a switching frequency between at least a first voltage value and at least a second voltage value, the first and second voltage values defining one of the at least two switching ranges;
   wherein the main module, in a first mode of operation is:
      coupled to the input terminal so as to store power from the input signal;
      configured to output the first voltage value to the first circuit node;
   wherein the main module, in a second mode of operation is configured to output the second voltage value different from the first voltage value to the first circuit node by using power stored during the first mode of operation;
   wherein the switching range of the PWM signal has an amplitude, calculated as a difference between the first and second voltage values, less than or equal to half the input voltage.

2. The device of claim 1, further comprising a low pass filter disposed operatively between the first circuit node and the output terminal, the low pass filter configured to filter at least the switching frequency of the PWM signal.

3. The device of claim 2, wherein:
   the device is adapted to change from a first switching range to a second switching range during use by altering the configuration of capacitors in the main module.

4. The device of claim 1:
   wherein the main module comprises:
      at least N capacitor modules, N being an integral number greater or equal to 2;
      small switches adapted to arrange the N capacitor modules according to any of the first and second modes of operation of any switching range;
   wherein, in the first mode of operation:
      the N capacitor modules are connected in series in a chain of capacitor modules between the input terminal and a ground terminal, each capacitor module having a first terminal which is on the side of the input terminal and a second terminal which is on the side of the ground;
      the first circuit node is coupled to ground, either directly or through an internal node of the chain of capacitor modules, with J capacitor modules being connected in series between the internal node and the ground terminal, J being an integer between 1 and N inclusive.

5. The device of claim 4, wherein, in the second mode of operation, L capacitor modules are connected in series between the ground terminal and the first circuit node, such that the first terminal of each capacitor module is on the side of the first circuit node and the second terminal of each capacitor module is on the side of the ground terminal, L being an integer less than or equal to N.

6. The device of claim 5:
wherein L is an integer greater than zero and less than or equal to N/2;
wherein, in the second mode of operation, the N capacitor modules are arranged in groups of L capacitor modules, the groups being mounted in parallel with each other.

7. The device of claim 4, wherein, in the second mode of operation, L capacitors modules are connected in series between the first circuit node and the input terminal, such that the second terminal of each capacitor module is on the side of the first circuit node and the first terminal of each capacitor module is on the side of the input terminal, L being an integer less than or equal to N and greater than zero.

8. The device of claim 1:
wherein the main module is configured to operate according to two modes of operation of a first switching range that is between the two modes of operation of a second switching range;
wherein one of the first and second voltage values of one of the two switching ranges is equal to one of the first or second voltage values of the other of the two switching ranges.

9. The device of claim 1, further comprising a master module configured to control the main module to operate using two specific modes of operation according to a given switching range and a given duty cycle.

10. The device of claim 9, wherein the master module is configured to change the switching range and/or the duty cycle that control the main module according to a comparison of a reference signal with the output voltage.

11. The device of claim 10:
further comprising as many comparators as there are switching ranges,
wherein the master module is configured to generate an error signal based on a comparison of the reference signal and the output voltage, and output the error signal to the comparators in order to create a PWM command signal for each switching range
wherein the master module is configured to control the main module in accordance to a combination of the PWM command signals.

12. A method for converting an input signal, having an input voltage, into a signal different than the input signal, the method comprising:
a main module creating a pulse-width-modulated (PWM) signal by outputting a voltage switching between a first voltage value and a second voltage value different than the first voltage value, with a given duty cycle;
wherein the first and second voltage values define a switching range, and wherein the main module is operative to define at least two different switching ranges by altering a configuration of capacitors;
wherein the PWM signal has an amplitude, calculated as a difference between the first and second voltage values in each switching range, less than or equal to half the input voltage; and
wherein the duty cycle of the PWM signal is operative to determine the output voltage value within each switching range.

13. The method of claim 12, wherein the PWM signal is smoothed through a low-pass filter to produce an output voltage.

14. The method of claim 12, wherein the creating the PWM signal comprises:
outputting the first voltage value while storing some power issued from the input voltage in a first mode of operation;
outputting the second voltage value by using the power stored during the first mode of operation in a second mode of operation.

* * * * *